US008611509B1

(12) United States Patent
Basart et al.

(10) Patent No.: US 8,611,509 B1
(45) Date of Patent: Dec. 17, 2013

(54) PHONE URL EXCHANGE FOR UNIFIED COMMUNICATIONS

(75) Inventors: Edwin J. Basart, Los Altos, CA (US); Thomas E. Miller, Mountain View, CA (US); Pascal R. Crausaz, San Jose, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 198 days.

(21) Appl. No.: 13/165,692

(22) Filed: Jun. 21, 2011

Related U.S. Application Data

(63) Continuation-in-part of application No. 12/424,438, filed on Apr. 15, 2009, now Pat. No. 8,331,542.

(51) Int. Cl.
*H04M 1/64* (2006.01)

(52) U.S. Cl.
USPC ............... 379/88.17; 379/142.15; 370/352

(58) Field of Classification Search
USPC ............... 379/93.28, 93.31, 88.17, 142.06, 379/142.17, 142.15, 142.07, 142.01, 90.01, 379/93.17, 93.25, 93.23, 93.01
See application file for complete search history.

(56) References Cited

U.S. PATENT DOCUMENTS

| 6,771,751 | B1 | 8/2004 | Kasturi et al. |
| 7,158,618 | B1 | 1/2007 | Kusuda et al. |
| 7,471,672 | B2 * | 12/2008 | Toyoda .......................... 370/352 |
| 7,526,078 | B2 | 4/2009 | Rodman et al. |
| 8,223,951 | B1 * | 7/2012 | Edelhaus et al. .......... 379/221.01 |
| 2002/0042265 | A1 | 4/2002 | Kumaran et al. |
| 2002/0067812 | A1 | 6/2002 | Fellingham et al. |
| 2004/0045034 | A1 | 3/2004 | Moroo |
| 2005/0018687 | A1 | 1/2005 | Cutler |
| 2005/0207411 | A1 * | 9/2005 | Ota et al. ...................... 370/389 |
| 2005/0212908 | A1 | 9/2005 | Rodman et al. |
| 2005/0213735 | A1 | 9/2005 | Rodman et al. |

(Continued)

FOREIGN PATENT DOCUMENTS

| WO | 2007091089 | 8/2007 |
| WO | 2008107675 | 12/2008 |

OTHER PUBLICATIONS

Communigate Pro, "CommuniGate Pro From the IT Department's Perspective," http://communigate.com/Papers/CGP_admin_view.pdf, Jun. 23, 2006, 7 pgs.

(Continued)

*Primary Examiner* — Creighton Smith
(74) *Attorney, Agent, or Firm* — Patent Law Works, LLP

(57) ABSTRACT

A system and for exchanging information to enable embodiment IP communication comprises a first endpoint corresponding to a first user, a second endpoint corresponding to a second user, and an information exchange (PURLX) unit. The PURLX unit comprises: a processor, a table and a phone URL exchange engine. The processor is configured for communication over the communications channel with a first endpoint and a second endpoint. The table stores information about the first user and the second user including a first association between the first user and one or more endpoint device addresses and a second association between the second user and one or more endpoint device addresses. The table is coupled for communication with the processor. The exchange engine establishes IP communication between the first user and the second user using information from the table. The exchange engine is coupled to retrieve information from the table and store information in the table and coupled to the processor for communication with the first endpoint and the second endpoint.

42 Claims, 16 Drawing Sheets

(56) References Cited

U.S. PATENT DOCUMENTS

| | | |
|---|---|---|
| 2007/0041517 A1 | 2/2007 | Clarke et al. |
| 2009/0157549 A1 | 6/2009 | Symons |
| 2009/0185555 A1* | 7/2009 | Hue et al. .................. 370/352 |
| 2009/0210467 A1 | 8/2009 | Iorio |

OTHER PUBLICATIONS

Communigate Pro, "Internet Communications Server, Email—Collaboration—VoIP," ftp://ftp.communigate.com/pub/cgpguide.pdf, 1998, 1098 pgs.

Communigate Pro, "CommuniGate Pro Overview," http://communigate.com/Papers/CGP_overview.pdf, Jun. 26, 2006, 4 pgs.

Communigate Pro, "CommuniGate Pro Carrier Suite: Rich Media Applications that drive subscriber retention & increase ARPU," http://communigate.com/Papers/Solutions_Overview_Carrier_Datasheet.pdf, Apr. 12, 2011, 2 pgs.

Communigate Pro, "CommuniGate Pro Enterprise Suite: Rich Media Internet Communications to boost effective business communications," http://communigate.com/Papers/Solutions_Overview_Enterprise_Datasheet.pdf, Apr. 12, 2011, 2 pgs.

* cited by examiner

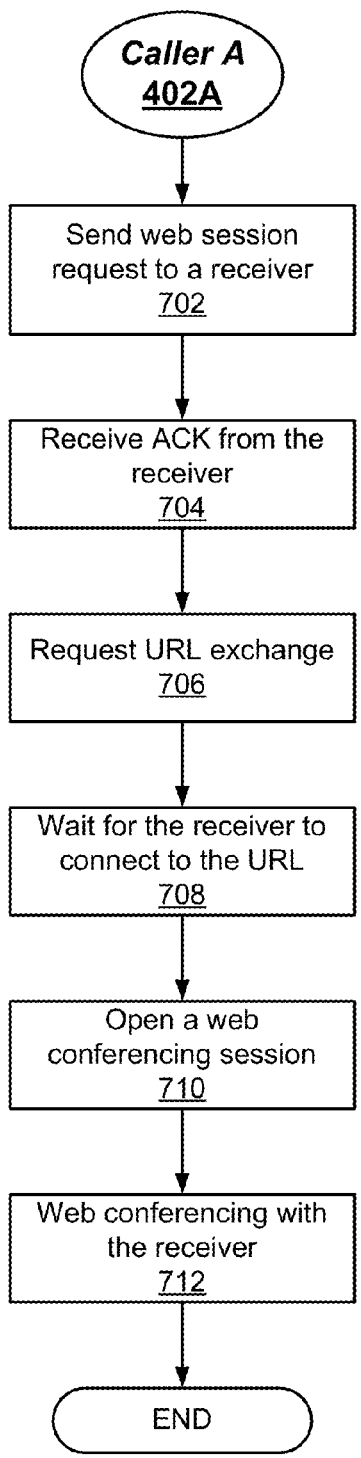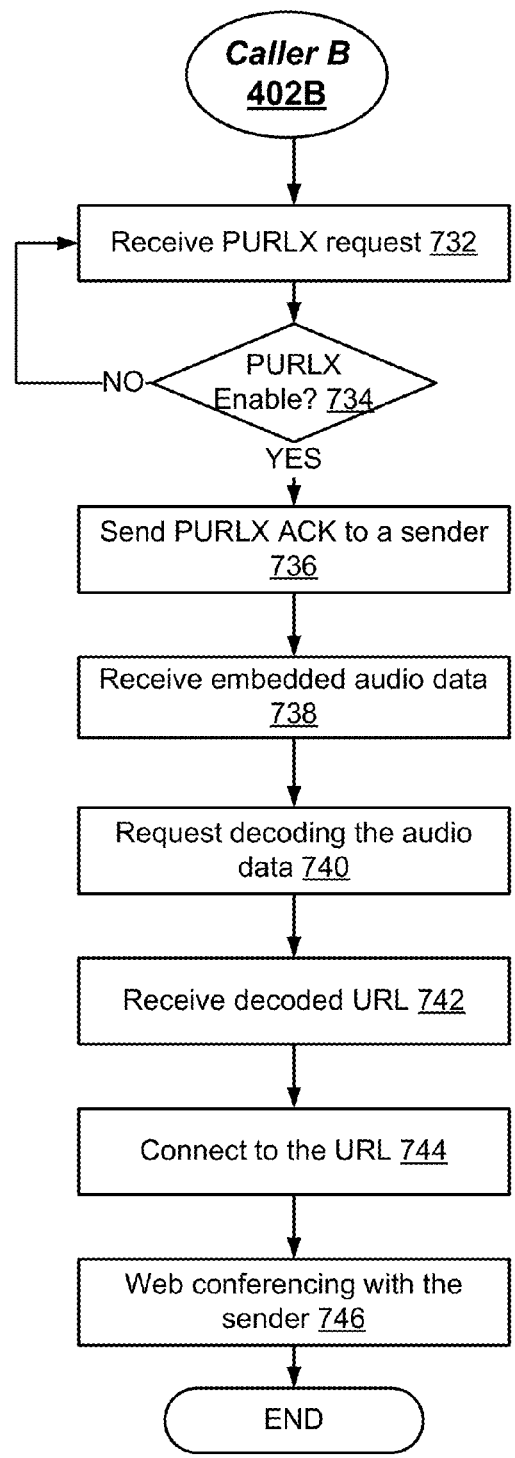
Figure 7A
Figure 7B

PHONE URL EXCHANGE FOR UNIFIED COMMUNICATIONS

CROSS REFERENCE TO RELATED APPLICATIONS

This application is a continuation-in-part application of and claims priority under 35 U.S.C. §120 to co-pending U.S. application Ser. No. 12/424,438, filed on Apr. 15, 2009, titled "Phone URL Exchange," which is incorporated by reference herein in its entirety.

BACKGROUND OF THE INVENTION

1. Field of the Invention

The present invention relates generally to information exchange in unified communications systems including telephony systems, electronic mail systems, voice mail systems, fax communications systems, Internet web-based systems and other communications systems. Particularly, the invention relates to facilitating the exchange of Universal Resources Locators (URLs) and Universal Resource Identifiers (URIs) with an acceptable level of security between systems without a pre-defined relationship over a standard phone line.

2. Description of the Background Art

Unified communications systems integrate a variety of communications systems, such as instant messaging, chat, presence, telephony, data collaboration-including presentation sharing, desktop sharing, application sharing, whiteboard sharing, editable document sharing with audit trails, video, email, voicemail and short message services, such that users are able to exchange information in various formats in the unified communications systems. However, the exchange of information between two or more parties in a unified communications system relies on a control mechanism such as a federation and a clearing house, which implies a formal relationship between the two parties. Both federation and clearinghouse mechanisms result in inconvenient and inefficient set-ups for information exchange, which is not suitable for information exchange between a sender and a receiver that have no or little relationship.

Web-based applications of a unified communications system, such as Microsoft SharePoint™, Google applications, file sharing of Flickr, YouTube and social networking sites (e.g., Facebook™ or MySpace™) allow users to communicate with a shared organizer, which implies communications set-up and some forms of formal relationship. However, existing web-based communications are still cumbersome in exchanging URLs or URIs between multiple parties. For example, a caller places a telephone call to another individual, listens as the other individual verbally provides an email address over the phone, and then sends an email message to the email address with the URL to be exchanged; or the caller and the other individual must be actively using the unified communication system. In yet another example, two parties uses cell phones and one party sends a short text message to the other party regarding the URL to be exchanged. A URI or a URL is used to identify or name a resource. A URL is a URI that, in addition to identifying a resource, provides means of acting upon or obtaining a representation of the resource by describing an access mechanism or network "location." From herein and throughout the specification, "URL" and "URI" are used interchangeably.

Traditionally, when dialing a telephone, a telephone number is encoded and transmitted across a telephone line as telephone tones, such as Dual-Tone Multi-Frequency (DTMF) tones. The tones "control" the telephone system by instructing where to route the call. These control tones are sent over the same telephone communications channel and in the same band as the voice and other sounds of the telephone call. One problem with DTMF is that the telephone tones are very loud and annoying to human senders and receivers. Further, when sending data that has low error tolerance, such as a URL transmitted using a modem, traditional DTMF signaling faces challenges to provide a secure and user friendly way to exchange URL over telephone communications channels.

As alluded to above, existing telephony systems in use today are not designed to exchange information for web-based applications, such as a URL for web conferencing, over telephone communications channels, especially in a secure and user friendly way. For example, one individual verbally provides a URL for a web conferencing session to a second individual using a telephone. Existing telephony systems do not have mechanisms to electronically exchange the URL even if sending and receiving apparatus (e.g., telephones) are able to receive such information with a URL encoding/decoding processing unit. The second individual must write down the URL or remember the URL and write it later or must be processed as in above examples, which is not convenient for telephone users to handle while simultaneously conducting a conversation.

The prior art has attempted to provide new variations on the unified communications federation and clearing house concepts by proposing a system where IP addresses can be derived from phone numbers. In such a system, a call established via the standard PSTN network can result in subsequent calls being established using the VoIP network. However, such prior art systems still rely on "a man in the middle" service acting as a clearing house between different entities, which requires some sort of pre-established relationship either between the entities or between the entities and the clearing house. For example, the entity must provide a phone number and IP address association for others to access.

Hence, there is a lack of a system and method that provides information exchange in general between unified communications systems with or without a pre-defined relationship over a communications channel. Particularly, there is a lack of a system and method that provides URL exchange using a telephony system between unified communications systems with or without a pre-defined relationship over a communications channel while providing an acceptable level of security.

SUMMARY OF THE INVENTION

The present invention overcomes the deficiencies and limitations of the prior art by providing a system and method for exchanging information, such as Universal Resource Locator (URL) or a Universal Resource Identifier (URI), over a communications channel. In one embodiment, the system comprises a first endpoint corresponding to a first user, a second endpoint corresponding to a second user, and an information exchange or PURLX unit. The information exchange unit is for automatically exchanging information for use in Internet Protocol (IP) communication between the first user and the second user. The information exchange unit comprises: a processor, a table unit and an exchange engine. The processor is configured for communication over the communications channel with a first endpoint of the first user and a second endpoint of the second user. The table stores information about the first user and the second user including a first association between the first user and one or more endpoint device addresses and a second association between the second user and one or more endpoint device addresses. The table is coupled for communication with the processor. The exchange engine establishes IP communication between the first user and the second user using information from the table. The exchange engine is coupled to retrieve information from the table and store information in the table and coupled to the processor for communication with the first endpoint and the second endpoint. The present invention also includes a number of methods such as a method for making an IP telephone call using an information exchange system; a method for establishing IP communication using an information exchange system; and a method for improving call quality using an information exchange system.

BRIEF DESCRIPTION OF THE DRAWINGS

The present invention is illustrated by way of example, and not by way of limitation in the figures of the accompanying drawings in which like reference numerals are used to refer to similar elements.

FIGS. 7A and 7B are flowcharts illustrating a process of two endpoints using a PURLX unit according to one embodiment of the present invention.

DETAILED DESCRIPTION OF THE PREFERRED EMBODIMENTS

Figure 1:
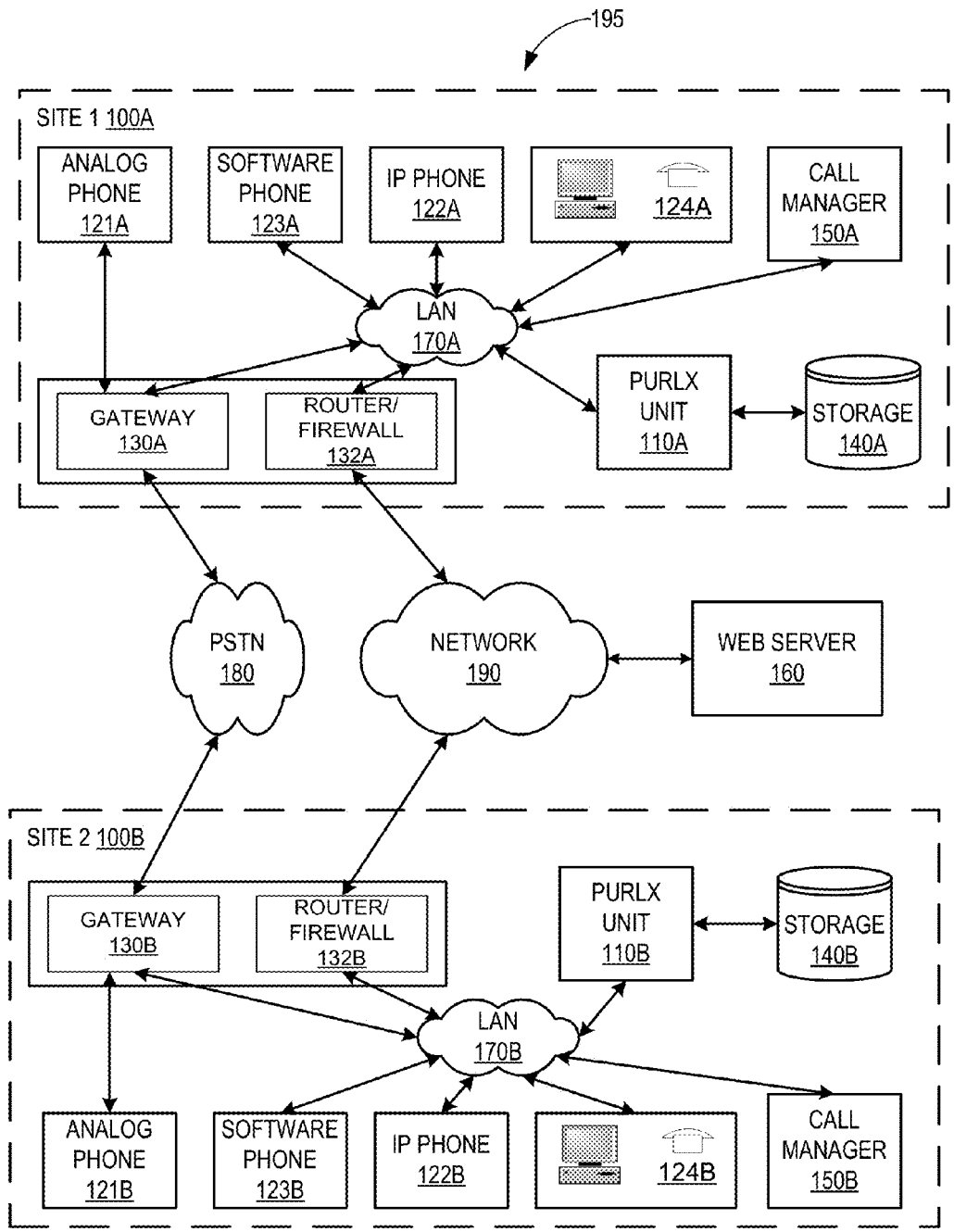
FIG. 1 is a high-level block diagram illustrating a phone URL exchange (PURLX) system according to one embodiment of the present invention.

A system and method for providing phone URL exchange capabilities for unified communications using a telephony system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the invention is described in one embodiment below with reference to user interfaces and particular hardware. However, the invention applies to any type of computing device that can receive a data and commands, and any peripheral devices providing services.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, flash memory including Universal Serial Bus (USB) keys with non-volatile memory or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein.

System Overview

Enterprises often have several offices or call centers that are located in a plurality of disparate locations. To interconnect all of these sites, enterprise unified communications systems and enterprise telephony systems have been developed. Enterprise unified communications systems integrate a variety of communications systems, such as instant messaging, telephony, data collaboration, video, email, voicemail, calendar and short message services (SMS), such that users are able to exchange information in various formats in the unified communications systems. Enterprise telephony systems, which comprise a set of voice gateways and servers, offer enterprise applications enabled by the integration of computer systems with telephony services. The software that supports the computer-integrated functionality is generally implemented as a client-server environment in which the participants or clients (distributed telephony users) communicate with a server.

FIG. 1 illustrates a high-level block diagram of a Phone URL eXchange (PURLX) system 195 according to one embodiment of the invention. The illustrated embodiment of system 195 includes a first site 100A and a second site 100B. As used herein, a site represents a grouping of computing resources. In the illustrated embodiment, the two sites 100A, 100B are communicatively coupled via a network 190. One skilled in the art will note that sites 100A, 100B can be physically distinct from each other or merely topology-related groupings that are not in physically distinct locations. The system 195 in FIG. 1 is used only by way of example. While FIG. 1 illustrates two sites, 100A and 100B, the invention applies to any system containing one or more related or unrelated sites. For example, the sites can belong to the same enterprise or belong to two related or unrelated enterprises without any relationship except telephone communications or voice over IP communications such as one using a Session Initiation Protocol (SIP).

The first site 100A includes an information exchange unit 110A or a Phone URL eXchange (PURLX) unit 110A, a gateway 130A, a route 132A with a firewall, four endpoints (analog phone 121A, 1P phone 122A, software phone 123A and smart phone-PC unit 124A), a device running a call manager application 150A, a local area network (LAN) 170A and a storage device 140A. The gateway 130A and the router 132A with the firewall may be combined in a single unit. The gateway 130A represents a VoIP device to which a number of telephony endpoints can be coupled, such as analog phones 121A, IP phones 122A, software phones (softphones) 123A and smart phone-PC unit 124A. Additionally, the endpoints can be coupled to the call manager application 150A via the LAN 170A. In the illustrated embodiment, the gateway 130A is coupled to the LAN 170. The gateway 130A is also coupled to a Public Switched Telephone Network (PSTN) 180 via an analog or digital trunk line (e.g., a T1 or E1 interface). In the illustrated configuration, the gateway 130A provides an interface for calls originating from or terminating on the PSTN 180. The router/firewall 132A is configured to restrict an application at one site from communicating with another application at another site for network security concerns.

An endpoint enables a user to carry on a phone call. Although in the illustrated embodiment the first site 100A has four endpoints (one analog phone 121A, one IP phone 122A, one softphone 123A and one smart phone-PC unit 124A), in other embodiments the first site 100A has different numbers and types of endpoints. An endpoint is coupled (via the LAN 170A) to the call manager application 150A, the PURLX unit 110A, or both. Each of the endpoints can also include a display device (not shown) that is used in conjunction with the phone of the endpoint.

An endpoint has a user interface to send data, such as audio data and URIs, to a user and receive data from a user. In one embodiment, an endpoint further communicates with a PURLX unit 110A directly, through LAN 170A or through the gateway 130A and the call manager application 150A for URL exchange. This embodiment is further described with reference to FIGS. 3 and 5-7. In another embodiment, an endpoint comprises a processor 210, a web browser 820, an application interface 830, and a PURLX engine 262, within the endpoint itself. This embodiment is further described with reference to FIGS. 8-9. In yet another embodiment, an endpoint 122, 123 connects to a computer 404 having a PURLX engine 264 that implements phone URL exchange processing. The endpoint 122, 123 and the computer 404 together perform the features or functions of the invention. This embodiment is further described with reference to FIGS. 10-11.

The analog phone 121A has, for example, a Telephone User Interface (TUI) that sends data through a speaker and receives data through a microphone and a keypad. The IP phone 122A has, for example, both a TUI and a graphical user interface that sends data through a display device associated with the IP phone 122A. In one embodiment, the IP phone's graphical user interface also receives data from a touch screen display device associated with the IP phone 122A. The softphone 123A has, for example, a software application that runs on a computer and sends data through a display device and a speaker and receives data through a microphone, a keyboard, and a pointing device. The smart phone-PC unit 124A comprises an IP phone and a computer such as a PC. The smart phone-PC unit 124A processes phone URL exchange in addition to audio data communicated through a speaker, microphone and a keypad. In one embodiment, the endpoints (e.g., the analog phone 121A, the IP phone 122A, the softphone 123A and the smart phone-PC unit 124A) collaborate with the call manager application 150A and the PURLX unit 110A to exchange URL data.

A device, such as a computer, running a call manager application 150A controls one or more endpoints with which it is associated. In one embodiment, the call manager application 150A is software or routines executable by a computer, or more specifically a processor. The call manager application 150A offers a user an interface through which he/she can perform call-related functions. Call manager application 150A can also trigger and specify URL data to be processed by the PURLX unit 110A and/or handle the decoded URL data generated by the PURLX unit 110A. While shown as operational as a separate module in this embodiment and FIG. 1, those skilled in the art will recognize that in other embodiments, the call manager application 150A may be operational as part of the gateway 130A or end points such as the IP phone 122A, the softphone 123A and the smart phone-PC unit 124A.

Although in the illustrated embodiment the first site 100A has only one call manager application 150, in other embodiments the first site 100A has a different number of call manager applications 150. A given endpoint is controlled by one call manager application 150. To communicate with an endpoint controlled by another call manager application 150, the call manager applications 150 communicate with each other. In one embodiment, two endpoints communicate with each other for the purpose of exchanging URLs over a communications channel.

The PURLX unit 110A is configured to implement features or functions of the invention. The PURLX unit 110A is coupled to the LAN 170A and can also be directly coupled to one or more endpoints, such as IP phone 122A and softphone 123A. In the embodiment illustrated in FIG. 1, one PURLX unit 110A, 110B is associated with each of the sites 100A, 100B. Other embodiments can have two or more PURLX units 110 in the site 100A or 100B. The PURLX unit 110 will be further discussed below with reference to FIGS. 2 and 3.

The storage device 140A contains directory information, including directory entries and associations between directories and phones. In one embodiment, the storage device 140A also contains information regarding the directory context of a phone. Alternatively, this information can be stored in the PURLX unit 110A. In one embodiment, directory context information includes one or more of the following: (1) a portion of a directory that is currently available for presentation (the portion could include, e.g., information from all entries versus information from entries that meet certain criteria); (2) a filter (if any) that was used to determine the entries in (1), such as a whitelist containing a list of phone numbers that are acceptable to exchange URLs via phone with others—similarly, the filter may be used to determine a blacklist containing a list of phone numbers that are marked as unacceptable to exchange URLs via phone with others; (3) a list of the entries in (1), which entries are currently being presented by the phone; (4) a list of the entries in (3), which entry is currently navigated to; (5) what call function (if any) the directory was invoked during a voice communication. Note that since the directory context specifies the information presented by the phone, storing the directory context enables later determination of what information is being presented by the phone.

Also, note that directory context information need not include all items (1)-(5). For example, if the entire directory and the filter (2) are known, the directory portion available for presentation (1) can be determined. In the illustrated embodiment, the storage device 140A is directly coupled to the PURLX unit 110A.

One skilled in the art will appreciate that additional networking devices (not shown) can be added to the first site 100A, for example, if needed to support additional endpoints, PURLX units 110 or other systems. For example, the first site 100A can include a second gateway 130A and an edge router to couple the first site 100A to the network 190 and to provide local area connectivity for the first and second gateways 130A, 130B. One skilled in the art will also recognize that numerous configurations of gateways 130A, 130B and communications links are contemplated. For example, PSTN links can be coupled to multiple gateways 130 at several points within the topology and soft-gateways 130 can also be used.

For convenience and ease of understanding, the second site 100B is shown with the same structure and functionality as the first site 100A. Specifically, the second site 110B includes four endpoints (analog phone 121B, software phone 123B, IP phone 122B and smart phone-PC unit 124B), a PURLX unit 110B, a call manager application 150B, a storage 140B, a LAN 170B and a gateway 130B. Gateway 130B of the second site 100B is communicatively coupled with the PURLX unit 110B. Similar as gateway 130A, the gateway 130B provides an interface for calls originating from or terminating on the PSTN 180. A call can involve more than one gateway. For example, a call that originates from an endpoint that is communicatively coupled to gateway 130A at site 100A out to the PSTN 180 through gateway 130B from the PSTN 180 and terminates on an endpoint that is communicatively coupled to gateway 130B of the second site 100B involves two gateways: gateway 130A of the first site 100A and gateway 130B of the second site 100B. Those skilled in the art will recognize that the first site 100A and the second site 100B may have less or more components that these shown in the FIG. 1.

In one embodiment of the invention, the network 190 is a partially public or a globally public network such as the Internet. The network 190 can also be a private network or include one or more distinct or logical private networks (e.g., virtual private networks or wide area networks). Additionally, the communication links to and from the network 190 can be wire line or wireless (i.e., terrestrial- or satellite-based transceivers). In one embodiment of the invention, the network 190 is an IP-based wide or metropolitan area network.

The system 195 of the invention also includes a web server 160 located at one of the sites 100A-B for communication with the PURLX unit 110 via the network 170. In another embodiment, the web server 160 is external to both sites 100A, 100B and coupled to the network 190 as shown in FIG. 1. The web server 160 can be a conventional web server, such as Apache Web Server. The web server 160 accepts data in a variety of formats and the data can be launched by a URL on a computer. For example, the web server 160 accepts Hyper Text Transfer Protocol (HTTP) requests from clients (e.g., endpoints) and serves the clients HTTP responses which usually are web pages located at the specified URL. Specifically, the web server 160 is communicatively coupled with the PURLX unit 110, the call manager application 150 or the gateway 130, and the web server 160 supports web-based communications associated with the URL exchanged over a telephone communications channel, such as web conferencing using the URL exchanged in conjunction with the use of any of the endpoints 121, 123, 122 or 124.

PURLX Engine 260

Figure 2:
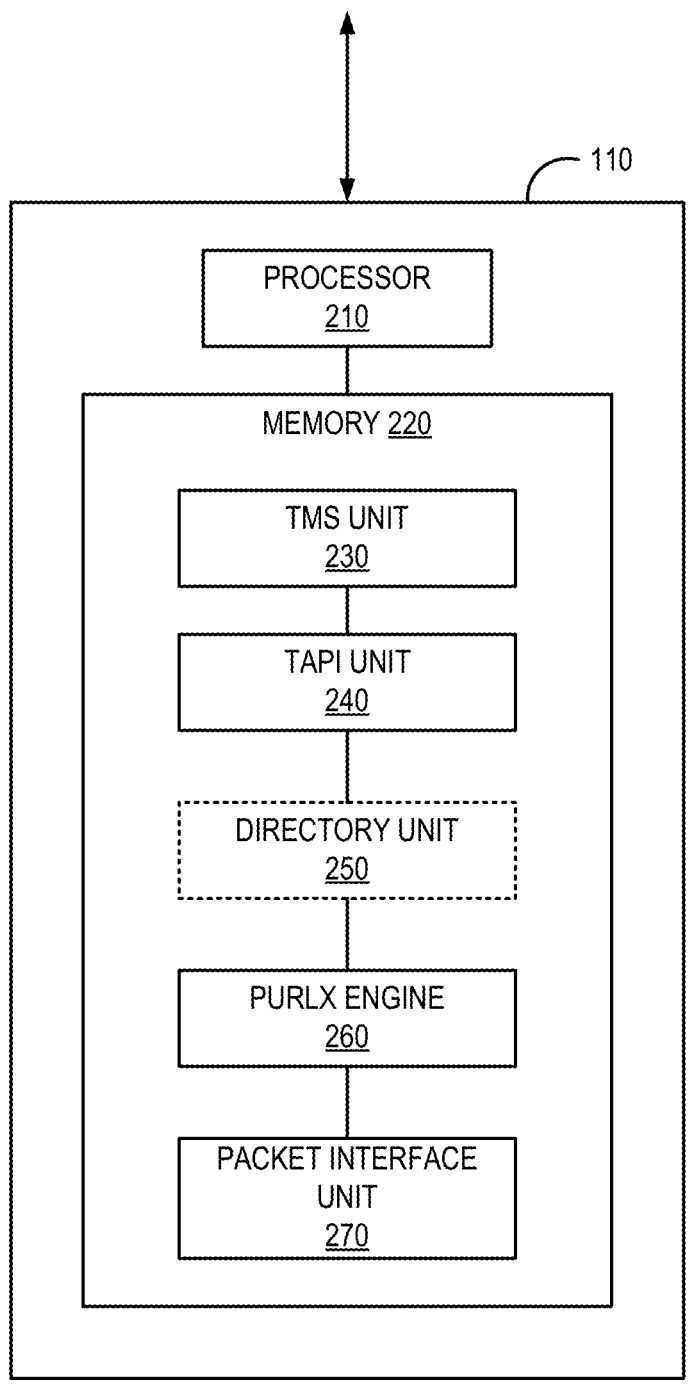
FIG. 2 is a block diagram illustrating a PURLX unit according to a first embodiment of the present invention.
Figure 8:
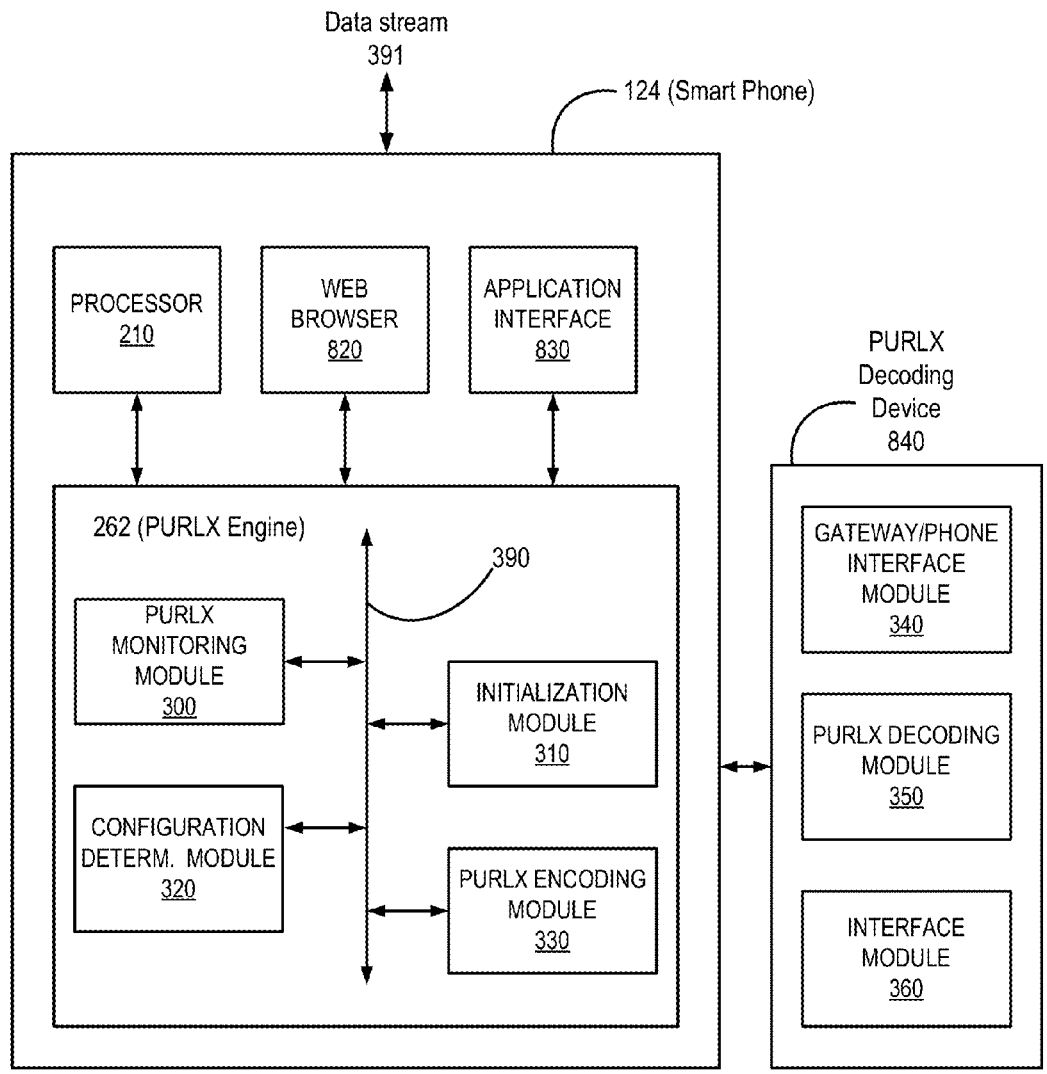
FIG. 8 is a functional block diagram showing a smart phone having a PURLX engine according to a second embodiment of the invention.

FIG. 2 shows an embodiment of the present invention in which a PURLX engine 260 is software operational on the PURLX unit 110. In another embodiment of the invention, the PURLX engine 260 is software operational on the gateway 130. The PURLX unit 110 receives the URL to be used for transmission and embeds the URL into audio data or communications control signals. In one embodiment, the URL embedded in the audio data or communications control signals are used at a receiving end for launching web-based applications such as web conferencing sessions by a web browser either embedded in the receiving device or on a computer. Other embodiments may implement the functionalities of a PURLX engine 260 in a variety of functional units. For example, a PURLX engine 262 in FIG. 8 is embedded within an endpoint itself. In another example, an endpoint connects to a computer having a PURLX engine 264 as shown FIG. 10 to implements the phone URL exchange functionalities.

Referring now to FIG. 2, a block diagram of a PURLX unit 110 on a hardware server according to one embodiment of the present invention is shown. In this embodiment, the PURLX unit 110 is configured to implement features or functions of the present invention. The PURLX unit 110 includes a processor 210 and a memory 220. The processor 210 can be a conventional processing device, such as a general-purpose microprocessor. The memory 220 includes computer program instructions or functional units that implement features of the invention. Specifically, the memory 220 includes a telephony management software (TMS) unit 230, a telephony application programming interface (TAPI) unit 240, an optional directory unit 250, a PURLX engine 260 and a packet interface unit 270. TMS unit 230 provides an event and call control path to the endpoints. TAPI unit 240 provides an application interface for the PURLX engine 260. The URLs sent or received by endpoints are transmitted to the TMS unit 230, the TAPI unit 240 and the PURLX engine 260.

In one embodiment, the memory 220 also includes one or more application units (not shown) or application interfaces (e.g., socket interface) that interact with the TMS unit 230 and the TAPI unit 240 to enable a specific computer-integrated function. An application unit uses the TAPI unit 240 to exchange data with the TMS unit 230. The TMS, or TAPI or any other mechanisms may be used to communicate with the processor 210 to indicate the inclusion of the URL to be embedded into audio data or as a part of the communications control signals. The memory 220 uses an application unit to inject the URL data into the audio data or the communications control signals or to signal the gateway 130 to include the URL data.

In the illustrated embodiment, the PURLX unit 110 includes an optional directory unit 250 in dashed lines. In general, the directory unit 250 enables a phone to access a directory and use the directory in conjunction with other phone functions. In one embodiment, directory unit 250 is implemented as a service that interacts with TMS unit 230. Communication or data exchange is between TMS unit 230 and directory unit 250. Although directory unit 250 is illustrated as executing on the PURLX unit 110, directory unit 250 can be distributed among computing devices as is known to one of skill in the art. For example, the functionality enabled by directory unit 250 can be implemented in a client-server fashion by having the client (user's local system, such as a general-purpose computer or endpoint) perform some functions and having the PURLX unit 110 perform others. As another example, some or all of the functionality enabled by directory unit 250 can be implemented by having a call manager application 150 perform some or all functions.

The PURLX unit 110 illustrated in FIG. 2 also includes the packet interface unit 270 that packs the received application data (e.g., URL and audio message data) into network packets according to the network protocols being used by the communications network (e.g., network 190). In one embodiment, the network protocol is Session Initiation Protocol (SIP) for setting update and tearing down multimedia communications sessions, such as voice and video calls over the Internet. Other embodiments use different network protocols such as Media Gateway Control Protocol (MGCP) for controlling mediate gateways on the Internet and PSTN, Remote Procedure Call, SIP, SOAP, H.323 and etc.

In the illustrated embodiment, the PURLX unit 110 includes the PURLX engine 260. The PURLX engine 260 is software or routines for exchanging a URL between two endpoints over a telephone communications channel. Specifically, the PURLX engine 260 encodes an URL and embeds the URL into audio data or as a part of the communications control signals. The PURLX engine 260 also decodes audio data or the communications control signals embedded with a URL. The PURLX engine 260 monitors calls between parties for a PURLX signal indicating that a first caller is requesting phone URL exchange with a second caller (i.e., a receiver of the call). The PURLX engine 260 then determines the URL encoding parameters including information to be sent and URL encoding method to be used. The PURLX engine 260 encodes the URL with the determined encoding method and embeds the URL into audio data or as a part of the communications control signals. The PURLX engine 260 may check a given user's rights or policies on receiving the embedded audio data or the communications control signals. The embedded audio data or the communications control signals are delivered by the telephony system to the receiver. Upon receiving audio data or the communications control signals embedded with a URL, the PURLX engine 260 decodes the embedded audio data or the communications control signals and delivers the decoded URL to its recipient such as an application module for further processing. The PURLX engine 260 is described in more detail below with reference to FIGS. 3 and 4.

Figure 3A:
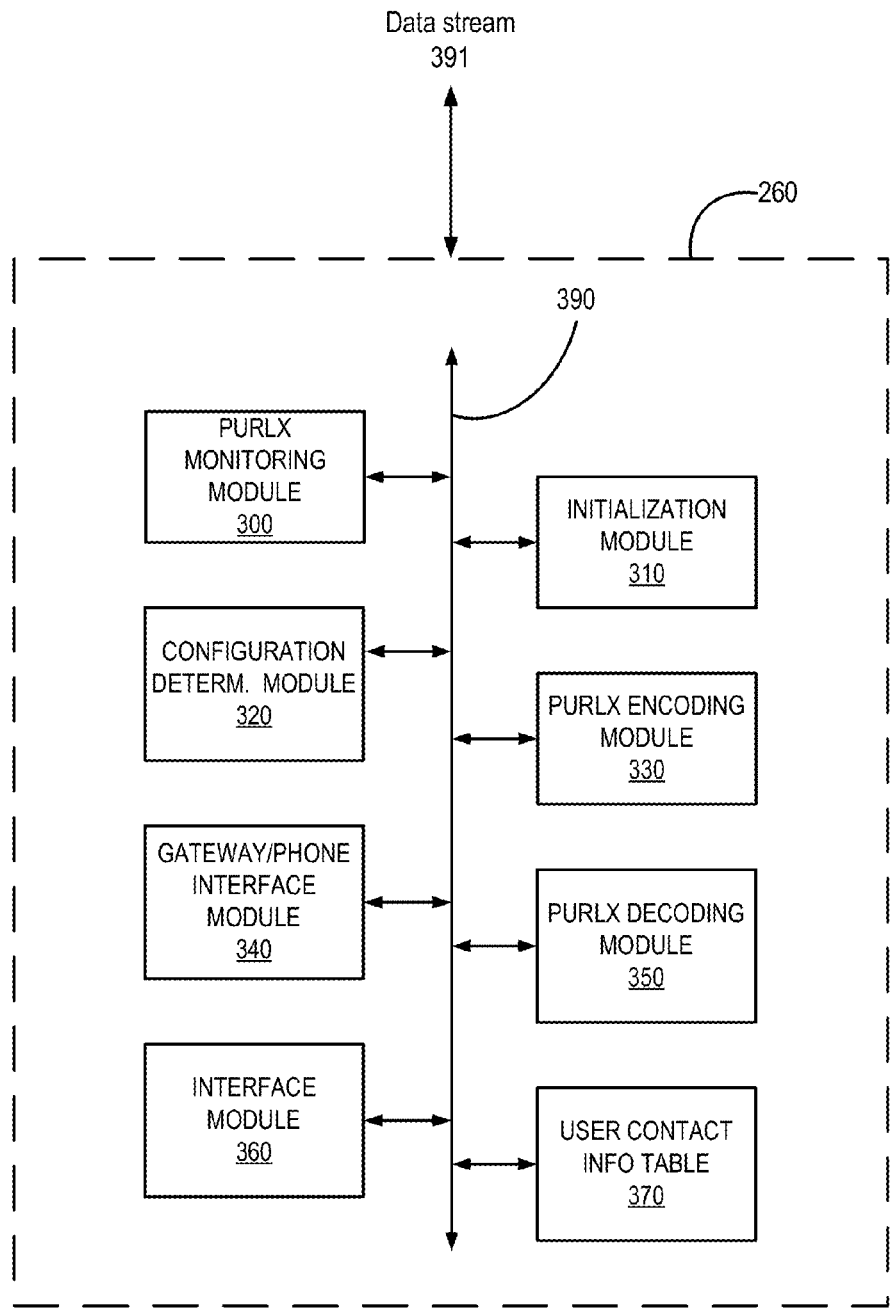
FIG. 3A is a block diagram illustrating a PURLX engine according to one embodiment of the present invention.

Referring now to FIG. 3A, one embodiment of the PURLX engine 260 is shown. The PURLX engine 260 injects processed audio data embedded with a URL into a data stream (e.g., audio data) 391 to be sent over a telephone communications channel. The PURLX engine 260 also extracts embedded URL data from the data stream 391 received by the PURLX engine 260. The PURLX engine 260 comprises a PURLX monitoring module 300, an initialization module 310, a configuration determination module 320, a PURLX encoding module 330, a gateway/phone interface module 340, a PURLX decoding module 350, an interface module 360, and user contact information table 370. These components cooperate together to provide the functionality of the invention and are coupled to each other for communication and interaction by bus or signal line 390. The operation of these modules 300, 310, 320, 330, 340, 350, 360 and 370 can also be better understood with reference to FIGS. 4, 5, 9 and 11 below in addition to the description that follows.

The PURLX monitoring module 300 is software and routines for determining whether a caller has input a signal requesting phone URL exchange and signaling other modules (e.g., 310, 320, 330, 340, 350, 360 and 370) of the PURLX engine 260 responsive to receiving a phone URL exchange request. In one embodiment, the PURLX monitoring module 300 interfaces with the call manager application 150 to determine whether any requests for phone URL exchange have been received from an application running on an endpoint or a computer. The PURLX monitoring module 300 is adapted for communication with the call manager application 150 or any application supporting the proper Application Programming Interface (API) being used by a signal line 390. The PURLX monitoring module 300 is advantageously able to identify when a request for phone URL exchange has been received, the parties on the call, a first party (a URL initiator) that has the URL to be exchanged, and one or more other parties (URL receivers) that receive the URL in an embedded audio data or in the communications control signals. The PURLX monitoring module 300 is also adapted for communication with the PURLX encoding module 330 to provide information about the URL to be exchanged.

In one embodiment, the PURLX monitoring module 300 monitors calls made to and from an endpoint and captures or retrieves information necessary to enable IP information exchange. For example, for each call made to a specified user, user A, the PURLX monitoring module 300 determines whether the other end point calling user A is enabled for IP information exchange, and if so during the call retrieves their IP information and stores it in the user contact information table 370. Similarly, for all calls made by user A to another endpoint, the PURLX monitoring module 300 determines whether the other end point is enabled for IP information exchange, and during the call retrieves their IP information and stores it in the user contact information table 370. In yet another embodiment, the PURLX monitoring module 300 exchanges IP information with other PURLX units 110 so that for commonly called numbers, the PULRX engine 260 has the IP information of other endpoints and can automatically establish those calls or IP communications over the IP network 190. For purpose of this application, IP information includes any one or more of: a public IP address; a URL; a URI; a name resolvable by a Domain Name Server (DNS); an e-mail address; a server address; a user address or login into on any system; addresses for other type of protocols used by additional forms of communication that might accompany a call such as IM, SMS for texting, MMS for passing multimedia such as images, video, presentations, etc. in addition to the call; or any other address that identifies or can be assigned to a user. In a first embodiment, each user is assigned a public IP identifier and the IP information exchanged and collected by the PURLX monitoring module 300 is the exchange of the public IP identifier associated with each user. In this first embodiment, the public IP identifier is one of a public IP address, a URL, a URI, a name resolvable by a Domain Name Server (DNS) or an e-mail address. In the case where the public IP identifiers are email addresses, users initially contact each other via the telephone but then PURLX units 110 exchange their email addresses. Each user's address can then be updated with the newly discovered email address, the PURLX units 110 use them to exchange the information. In a second embodiment, each endpoint or device used by the user has a device address or identifier, and the IP information exchange and collected by the PURLX monitoring module 300 are the device addresses used by the user.

The initialization module 310 is software and routines for initializing operation of the phone URL exchange functionality. The initialization module 310 is coupled by signal line 390 to the other modules 300, 320, 330, 340, 350, 360 and 370 for initializing their operation. The initialization module 310 is also coupled to signal line 390 for communication with the call manager application 150 to enable specific endpoints so that they are able to utilize the phone URL exchange functionality. In one embodiment, initialization of different endpoints (e.g., an IP phone 122A and a softphone 124A) includes enabling an endpoint to use the phone URL exchange functionality, such as receiving a decoded URL, and notifying other modules responsible for launching a web browser and connecting to a web conferencing session located at the website indicated by the URL.

In one embodiment, the initialization module 310 also communicates with the directory 250 to validate the URL sender and receiver against a whitelist and/or blacklist stored in the directory 250 and/or a given user's rights or policies on receiving the embedded audio data or the communications control signals. For example, the initialization module 310 accepts a phone URL exchange request from a URL sender on the whitelist and rejects a phone URL exchange request from a URL sender on the blacklist. Similarly, the initialization module 310 may validate a URL receiver against the whitelist and/or blacklist. For example, the initialization module 310 delivers audio data or the communications control signals embedded with an URL to a URL receiver on the whitelist, and rejects the audio data or the communications control signals embedded with the URL to a URL receiver on the blacklist. Other embodiments implement the above validation in an application layer. Similarly in other embodiments, the initialization module 310 also communicates with the user contact information table 370 to validate the information stored for other users in the user contact information table 370.

The gateway/phone interface module 340 is software and routines for determining the information to be sent over the telephone communications channels. In one embodiment, the information to be sent includes the URL requested by the sender, content of an audio message to the receiver, data sharing format such as text chat, white boards and audio-video conferencing and data to be shared (e.g., text, audio and video). The information to be sent in one embodiment is determined based on a pre-defined configuration. For example, the call manager application 150 is configured according to the pre-defined configuration to detect and retrieve the URL of a sender's conference (i.e., the URL identifying the sender's conference) on his/her associated gateway 130. In another embodiment, the information is determined on-the-fly, where the PURLX engine 260 asks the URL sender to identify the information to be sent. For example, upon detecting an input signal requesting phone URL exchange from a URL sender, the call manager application 150 is configured to prompt an inquiry on the caller's telephone user interface asking the sender to specify his/her conference by selecting the conference from a list or by entering it through an input means. In one embodiment, the URL data is input on a phone keypad as a series of characters including numbers running from 0 to 9 and alphanumeric characters running from [a-z] and [A-Z] as well as additional special characters. In another embodiment, on an IP phone, the sender can either select the conference from a list or enter it through a keypad.

The gateway/phone interface module 340 comprises software and routines for communicating with and controlling the gateway 130 or the IP phone 122. In one embodiment, the gateway/phone interface module 340 has two subsets of software and routines, one for communicating with and controlling the gateway 130 and the other for communicating with and controlling the IP phone 122. The gateway/phone interface module 340 may have an internal control to switch between the two sets of routines. The gateway/Phone interface module 340 is coupled by the signal line 390 to the gateway 130, IP phone 122 and the PURLX unit 110. The gateway/phone interface module 340 allows the PURLX engine 260, to communicate with the gateway 130 and/or the IP phone 122 to deliver audio data or the communications control signals embedded with a URL to its intended recipient, and reconnects and disconnects callers from one another.

Once the information to be sent has been determined, the configuration determination module 320 further selects which URL encoding method to encode the URL and to embed the encoded URL into audio data or as a part of the communications control signals. An encoding method describes a methodology being used to encode a URL and a signaling scheme for the determined URL.

Various methodologies for encoding a URL can be used in the scope of the invention. For example, a URL may be encoded using an ASCII Binary encoding method. Using the ASCII Binary encoding method, a URL data is packetized and converted from one format, e.g., ASCII formatted data, to anther format, e.g., Binary Coded Decimal (BCD) formatted data. If the call is a digital phone line, it is noted that not all binary values are valid, depending on the telephony coding scheme. This means that binary codes cannot be directly sent over a telephony line. For example, T-1 lines using channel associated signaling (CAS) utilize robbed bit signaling, which utilizes one of the 255 values in certain data bytes for control signals. The alphanumeric and special characters can be converted to ASCII as defined by the ASCII table from the ANSI committee. The encoded URL is then sent from the URL sender to its intended recipient over the telephone communications channel using a selected analog signaling scheme such DTMF or multi-frequency (MF) tones. DTMF is an intrusive signaling scheme used in telephone systems to converts numbers/characters found on standard telephone keypads to a particular frequency set, which can be converted back to the particular number. MF is similar to DTMF, but uses a different set of tones than those found on a telephone keypad.

In another embodiment, a URL may be encoded in a non-intrusive manner using steganography techniques. A steganography technique is a form of security through obscurity technique that data desirable to transport (i.e., to hide) is hidden in a carrier (i.e., signal, stream, or data file). A steganography technique enables the hidden data to be communicated in such a way that no one apart from the sender and the intended recipient realizes there is a hidden data in a data stream publicly transmitted over a communications channel. Electronic communications can include steganographic coding inside a transport layer, such as a file, or protocol, such as User Datagram Protocol (UDP). Media files (e.g., audio and video clips) are ideal for steganographic transmission because of their large size and/or the nature of a live audio stream. Taking UDP as an example, the URL to be exchanged is a part of the payload of a UDP packet. The steganography technique embeds the URL payload into a voice stream. The resulting signal/stream (e.g., a voice stream with embedded URL) is transmitted over a telephone communications channel. Care needs to be taken in the case of an analog telephone line, as converting a digital stream to analog and back to digital can introduce errors.

Other URL encoding and signaling algorithms are known to those of ordinary skills in the art, to whom the usage thereof within the context of the invention will be readily apparent, in the light of the specification. In one embodiment, a URL is encoded using modem signaling to be transmitted over a telephone communications channel. Similar to caller identification (Caller ID) service that transmits a caller's number to a called party's telephone equipment before the call is answered, during the quiet periods between ringing signals, or when the call is being set up but before the call is answered, the URL is encoded as a telephone number.

A related signaling technique is Caller ID while call waiting, which transmits a telephone number during a call, and the audio path to the listening parties is suppressed during transmission. A more general telephony technique than transmitting Caller ID numbers is Analog Display Signaling Interface (ADSI). ADSI is a combination of DTMF and Bell 202 modem signaling. The modem signaling supports the ASCII character set and allows longer strings than telephone numbers. The audio path is suppressed during transmission. The techniques to encode digital information (such as URL) into analog waveforms appropriate for an analog modem are readily known to those of ordinary skills in the art. The advantages of using modem signaling are higher data rate and a low error rate for encoding the URL onto an analog telephone line.

In another embodiment, a URL is encoded into an in-band signaling within a Real-Time Protocol (RTP) stream for VoIP calls between enterprises. In-band signaling is a mechanism to send metadata and control information in the same band, or on the same channel, as used for audio data. A RTP stream permits arbitrary binary data; however, the data is heard as sounds if played directly by the receiving phone. This can be overcome by encoding a tone to indicate that the stream should be muted, similar to Caller ID while call waiting and ADSI signaling. The signaling can be disguised using various coding methods, such as using steganography as described above. RTP streams have the option of encoding arbitrary digital data within the stream but not heard by the receiving phone, and are thus out of band. The Request for Comment (RFC) 2833 option for the RTP protocol describes how a packet header can indicate an arbitrary payload.

In yet another embodiment, a URL is encoded using Integrated Services Digital Network (ISDN) signaling. The ISDN D channel carries all signaling between a customer's terminal device and a carrier's end switching device. Using ISDN signaling, a URL is encoded as a part of the signaling transmitted over the D channel between the URL's endpoint and its associated switching which further transmits to the ISDN terminating equipment, where it is retrieved from the D channel and passed to the PURLX engine 260 and to its intended recipient.

Other URL encoding methods include Session Initiation Protocol (SIP) signaling and white noise signaling. SIP is a signaling protocol widely used for setting up and tearing down multimedia communications sessions such as voice and video calls over the Internet. A URL can be encoded as a part of SIP control signaling from a user agent on the transmitting user's telephony system to the user agent on the receiving user's telephony system and then passed to the PURLX engine 260. One skilled in the art will appreciate that individuals communicating with SIP softphones communicate using an embodiment of the invention independent of the PSTN network 180.

White noise is a random signal (or process) with a flat power spectral density. White noise exists at low levels in all telephony applications. Extra white noise is even added in cases where there is very little sound in order to give user the feeling that he/she is connected. This is called comfort noise generation. In one embodiment, the URL can be steganographically embedded in the low level white noise generated by the telephony system. The encoded URL is embedded into audio data and gets transmitted over a telephone communications channel. The recipient decodes the white noise and reconstructs the URL.

Referring back now to the PURLX encoding module 330, the PURLX encoding module 330 is software and routines for encoding a URL based on the encoding method selected by the configuration determination module 320. The PURLX encoding module 330 is coupled to signal line 390 for communication with the other modules this 300, 310, 320, 340, 350, 360 and 370. Encoding a URL includes: receiving and processing a signal from the PURLX monitoring module 300 indicating a user has requested phone URL exchange, interacting with the configuration determination module 320 to determine the information to be sent and encoding method to use, encoding the URL into audio data or as a part of the communications control signals using the determined encoding method and controlling the gateway/phone interface module 340 to deliver the audio data or the communications control signals embedded with the URL to its intended recipient. The operation of the PURLX encoding module 330 is described in more detail below with reference to FIGS. 4-6.

The PURLX decoding module 350 is software and routines for decoding audio data or the communications control signals including a URL. The PURLX decoding module 350 is coupled to signal line 390 for communication with the gateway/phone interface module 340. Decoding audio data or the communications control signals embedded with a URL includes: discovering the embedded audio data or the communications control signals on a receiving end (e.g., an IP phone 122), identifying the encoding method used in the embedded audio data or the communications control signals and decoding the embedded audio data or the communications control signals using a decoding method corresponding to the identified encoding method. For example, for an embedded audio data encoded using in-band signaling within a RTP stream, the PURLX decoding module 350 decodes the embedded audio data into an audio data payload and a decoded URL. Once decoded, the decoded data (e.g., audio data and URL) is sent to the gateway/phone interface module 340 for further processing, such as notifying a receiver of the received data, and waiting for a confirmation from the receiver. The interface module 360 notifies a web server associated with the receiver and the web server waits for the receiver to connect to the received URL.

The interface module 360 is software and routines for interfacing with other components of the phone URL exchange system 195, and these components are communicatively coupled to the PURLX engine 260. The interface module 360 is coupled to the signal line 390 for communication with the other components such as the call manager application 150 and the IP phone 122. The interface module 360 initiates the sending of a URL embedded in audio data or as a part of the communications control signals to its recipients. The interface module 360 also communicates with the call manager application 150 to handle the URL, and the call manager application 150, in turn, invokes a web browser to render the URL into its corresponding HTML files and communicates the rendered URL with the web server 160.

The user contact information table 370 is used for storing associations between users, user identification numbers, IP information and device addresses. As has been noted above, this information is captured by the PURLX monitoring module 300 and stored in the user contact information table 370. Those skilled the art will recognize that other modules (not shown) such as a PURLX exchange module could transfer this information between PURLX units 110. In one embodiment, the user contact information table 370 includes the IP information for a number of users along with lists of users that are permitted to access the IP information.

Figure 3B:
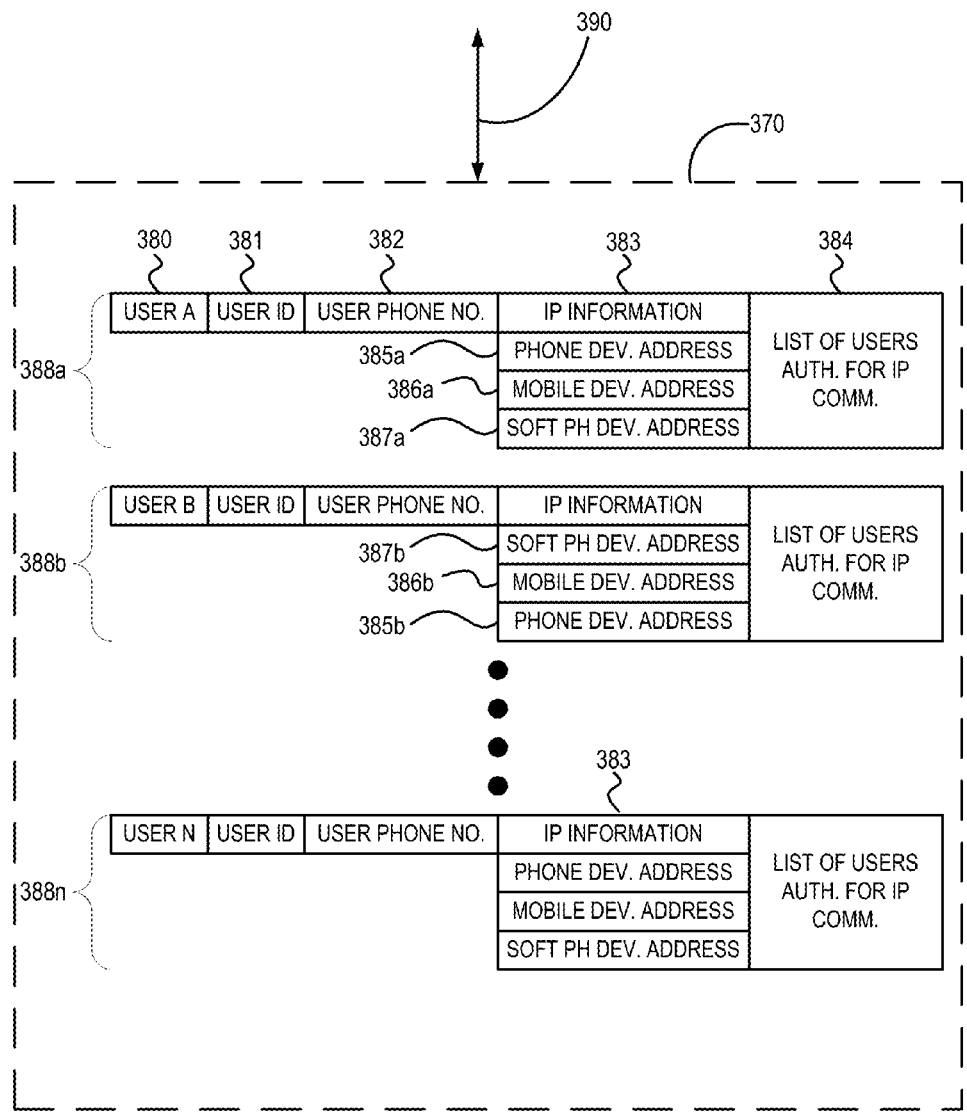
FIG. 3B is a block diagram illustrating a user contact information table according to one embodiment of the present invention.

Referring now also to FIG. 3B, one embodiment for the user contact information table 370 is shown. This example of the user contact information table 370 advantageously has one record 388 for each user. For example, the user contact information table 370 in FIG. 3B includes a plurality of records 388a-388n with each record being for a corresponding user A to user N. Each of the records 388a-388n includes a plurality of additional fields including a username field 380, a user identification number field 381, a user phone number field 382, an IP information field 383, a field 384 for storing a list of users authorized to receive the IP communication information of this user, a phone device address field 385, a mobile device address field 386, and a soft phone device address field 387. Those skilled in the art will recognize that the records 388a-388n may include other additional fields or fewer fields depending on the needs of the information exchange system 110. For example, instead of a single IP information field 383 that stores any of the above-identified types of IP information, an alternate embodiment includes a plurality of fields, one for each type of IP information noted above, e.g., a public IP address field, a URL field, a URI field, a name resolvable by a Domain Name Server (DNS) field, an e-mail address field, and a server address field. Yet other embodiments include one or sets of the above fields. Furthermore, yet other embodiments include any number of additional fields for an association between the telephone number field 382 and a directory entry to store any information that can be used to locate a communication device on the network.

The username field 380 is a field for storing a user name for the user corresponding to this record. In one embodiment, the user name is used only by the exchange system 195. In another embodiment, the user name is the same name used by the user in an IP telephony system (not shown). In yet another embodiment, the user name can be set by the user using an interface to access the phone exchange system 195.

The user identification number field 381 is used to store a unique user identification number for the user as provided by the exchange system 195. In one embodiment, the user identification number is unique across all PURLX units 110. The user identification number allows the PURLX units 110 to differentiate between different users, especially when users have selected the same user name for field 380.

The user phone number field 382 is the phone number or extension assigned to the user in their IP telephony system.

The IP information field 383 is used to store IP information that is provided by the system 195 to allow users to engage in IP communication. In another embodiment, the IP information field 383 is used to store the IP identifier described above. For example, the Web server 160 may provide or be responsive to IP addresses, URIs or URLs that have been purchased and are accessible through a domain name service (DNS). In an example embodiment, the public IP address may have a format such as username.companyname.com. In such a case, the Web server 160 is able to use the public IP address as will described in more detail below to initiate a web session or other IP communication between two users.

Field 384 is used to store a list of users authorized to receive the IP communication information of this user. A particular user may have called or identified other users which it is willing to exchange information to establish IP communication. As noted above, the IP communication may be an IP telephony call or some other type of data collaboration or sharing. In one embodiment, the information in field 384 is typed so that applications can recognize it and how the information can be used. This field 384 is used to store the user IDs of other users that this user has authorized for IP communication. Before attempting to establish IP communication with another user, the PURLX engine 260 checks that the user ID for the user being called user is in this field 384. In one embodiment, this field 384 is used to store a white list of users that can be called. In another embodiment, this field is used to store a blacklist of users that cannot receive the user's IP information. In a third embodiment, this field 384 stores both a white list and a blacklist of users. In another embodiment, this field 384 and the operation of the PURLX unit 110 allows PURL users to selectively share contact information in the form of any other identifiers which they wish to share with other users subject to other aspects of the invention such as the white list and blacklist. For example, the URL may be to a social network or micro-blogging of another user and the invention allows users to exchange such information so that they can then be connected on these other applications.

The phone device address field 385, the mobile device address field 386 and the soft phone device address field 387 are fields for storing the device address for a physical phone, a mobile phone, and a soft phone, respectively. In one embodiment, these device address fields 385, 386, 387 are used to store IP addresses specific to particular devices. The PURLX engine 260 cooperates with the switch 130 and/or call manager 150 to establish an IP connection between device addresses for the users. Those skilled the art will understand that not all of the fields 385, 386, 387 are required to have address information. For example, if the user only has a mobile phone but not a soft phone or physical phone, only field 386 will be used and store the device address of the user's mobile phone. Similarly if the user only has a physical phone and not a mobile phone or soft phone, then the record 388 for the user will only have information in the phone device address field 385. In another embodiment as shown in FIG. 3B, the order of the fields 385, 386, 387 provides the PURLX engine 260 with a priority in which to establish connections to the respective devices. For example, for user A in record 388A, the fields are in the order of phone device address 385A, mobile phone device address 386A and soft phone device 387A. Thus the PURLX engine 260 first attempts to establish communication with the physical phone using the phone device address in field 385A, then the mobile phone using the mobile device address in field 386A, and finally the soft phone using the soft phone device address in field 387A. The order of the device addresses can also be used by the PURLX engine 260 for fall back or bypass order. In contrast, compare the order of the fields for user B. For user B, the priority order for establishing IP communication between user B and another user is first to establish communication with the soft phone, then the mobile phone than the physical phone. This priority order is specified by the order in which the soft phone device address field 378B, the mobile phone device address field 386B and the phone device address field 385B are ordered in record 388B.

While the PURLX engine 260 has been described as including the user contact information table 370, those skilled in the art will recognize that this user contact information table 370 may be stored, maintained and used in other locations. In one embodiment, a database that is part of the Web server 160 stores the user contact information table. In other embodiments, the user contact information table 370 is part of directory unit 250. In other embodiments, each PURLX engine 260 has its own user contact information table 370 storing different subsets of information. In still other embodiments, the user contact information table 370 is a component of the PURLX unit 110. Those skilled in the art will recognize that in other embodiments, rather than relying on the first call between endpoints over the PSTN 180, the IP information could have been shared between end points ahead of time (not just once an initial connection has been made).

Moreover, those skilled in the art will recognize that the use of the user contact information table 370 is particularly advantageous because the information is tied to the user, and not some specific device. This allows the present invention to establish connections between users regardless of the devices to which a user has access. This also allows the present invention to fall back to different devices in order specified by the user for establishing communication with the user. Furthermore, since the access is tied to user, control of the IP communication can be completely independent from whether a particular user is a member of an organization or an authorized user of an organization.

Figure 4:
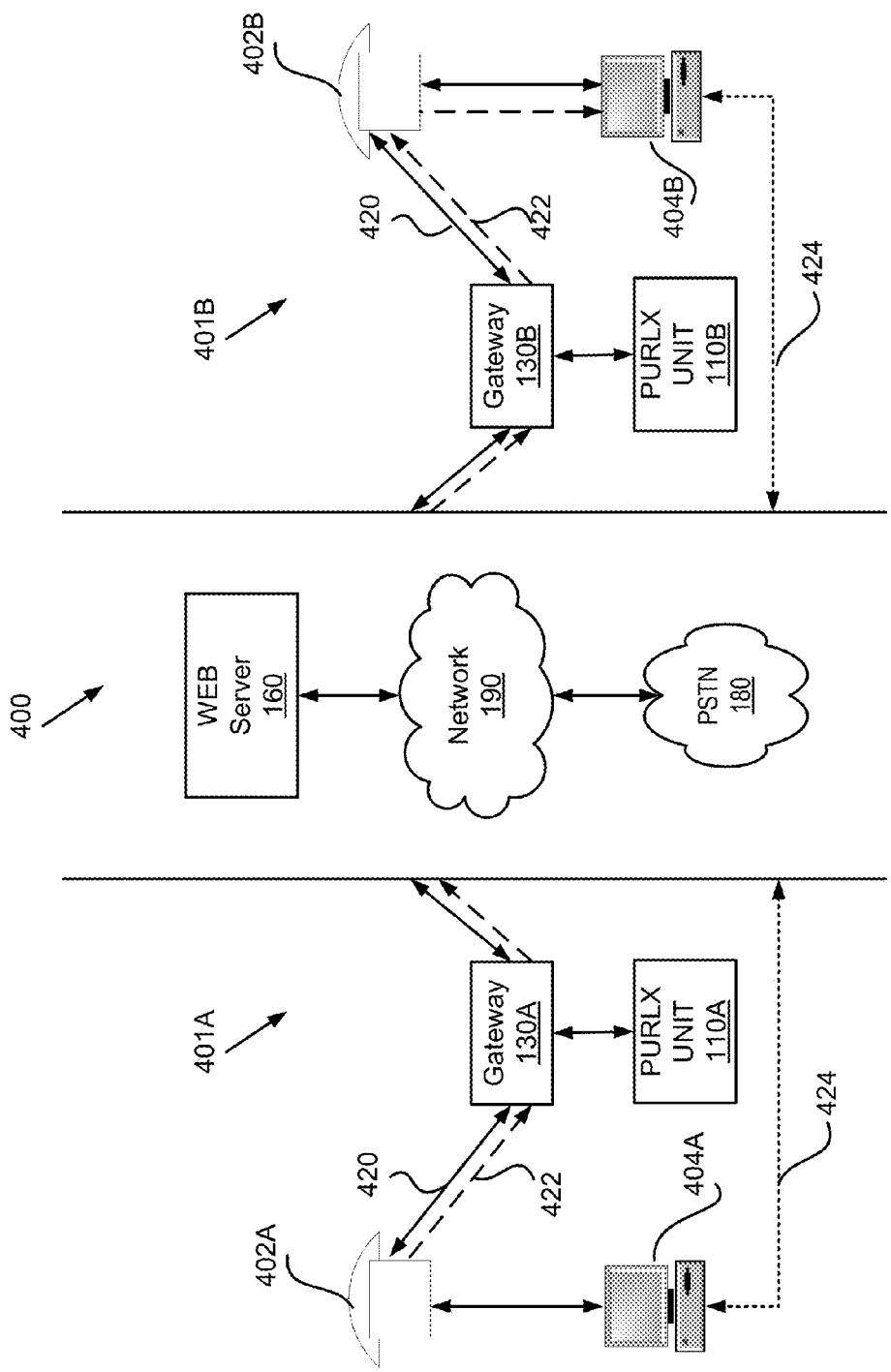
FIG. 4 is a block diagram of a distributed telephony system including a plurality of PURLX units according to one embodiment of the present invention.

Referring now to FIG. 4, one embodiment of a telephony system 400 utilizing the invention is shown. In particular, FIG. 4 shows a block diagram illustrating an example with a first caller communicating with a second caller and how the invention exchanges a URL between the callers over a telephone communications channel. As shown in FIG. 4, the first caller has a system 401A that includes an endpoint 402A (e.g., an IP phone 122) and a computer 404A for communicating audio data with the second caller. The system 401A of the first caller is communicatively coupled with a gateway 130A and a PURLX unit 110A. Similarly, the second caller has a system 401B that includes an endpoint 402B and a computer 404B for communicating audio data with the first caller. The system 401B of the second caller is communicatively coupled with a gateway 130B and a PURLX unit 110B. These system configurations 401A, 401B are provided only by way of example, and those skilled in the art will recognize that there are a variety of other configurations for the systems of the first caller and second caller. To simplify description of an embodiment, the first caller is also referred to as the reference number for endpoint 402A and second caller is referred to as the reference number for endpoint 402B.

Initially, a call is established between the first caller 402A and the second caller 402B. This call could be audio only or audio embedded with a URL. The call could be an audio message requesting a web conferencing session from the first caller to the second caller. The audio data of the call along with the signaling of the call (e.g., PSTN signaling, or SIP signaling) is represented by solid line 420, the embedded URL is represented by the dashed line 422, and the web data corresponding to the embedded URL data 422 is represented by the dashed line 424. Once the second caller 402B confirms to join the web conferencing session, the first caller 402A presses a special key on his/her keypad, or a button in the application or a key on the keyboard of the computer to signal a phone URL exchange request. In one embodiment, the system 401A communicates with the PURLX unit 110A to validate the URL initiator (i.e., the first caller) and the URL receiver (i.e., the second caller). In another embodiment, the URL initiator and receiver validation is optional. The PURLX unit 110A further determines the information to be sent and URL encoding method. For example, the PURLX unit 110A determines the URL of the first caller's conference for a web conferencing session and audio message to embed the URL based on a pre-defined configuration. The PURLX unit 110A encodes the URL using the determined method (e.g., steganography in a voice stream) and embeds the encoded URL (represented by the dashed line 422) into one of the audio messages sent by the first caller. The first caller 402A communicates with the second caller 402b via the gateways 130A-B, the PSTN 180 and the network 190 in one or more audio messages. The encoded URL 422 embedded with the audio data of the call along with the signaling of the calls 420 is delivered from the first caller 402A to the second caller 402B (e.g., the arrowed path of 422 URL data from the first caller 402A to the second caller 402B). The web data 424 corresponding to the embedded URL data 420 are communicated between the first caller 402A and 402B. The interface module 360 of the PURLX unit 110 determines whether the same URL is to be used or a variation of the URL to be used by the URL sender and the receiver. For example, the URL sender may uses a variation of the embedded URL as "http://server/meeting/leader/123" and the receiver uses another variation of the same embedded URL as "http://server/meeting/participant/123". Once the embedded audio data being delivered to the second caller 402B, or in parallel to the embedded audio data being delivered to the second caller 402B, the first caller 402A launches a web browser and a web conferencing session using the URL exchanged through the web server 160.

On the receiving end of the audio data embedded with the URL, e.g., the second caller 402B, the PURLX unit 110B detects the embedded audio data by the gateway 130B in one embodiment, or by the computer 404B in another embodiment. The second caller 402B communicates with the PURLX unit 110B to decode the embedded audio data. The second caller 402B receives the decoded URL, launches a web browser from the computer 404B and connects to the web conferencing session at the received URL ending on the web server 160.

In another embodiment, a caller may call an automated attendant (i.e., non-human receiver on the other end of a call). The caller may be presented with an option to receive a URL from which the caller can get further information from the web page located at the URL or to provide information in a web form associated with the URL.

To further illustrate the example in FIG. 4, a real world scenario using the invention is presented. A typical scenario may be as follows: Alice works for company A which uses some of product development tools of company B. Both companies use a telephony system that has implemented the phone URL exchange functionality according one embodiment of the invention. Other than the PURLX telephony system, the two companies have no prior information exchange experience with each other. Alice calls Bob, a technical support at company B, for some technical problems she has encountered during her product development. Bob asks Alice if she would mind performing a web conferencing session on her system so that Bob can actually see some specific configuration screens of the product development. Alice agrees.

At this point, Bob presses a special key on his IP phone. The URL for Bob's conference on his collaboration bridge is retrieved by the system. The URL is encoded into an audio message according to the encoding method determined by the system and sent on the telephone line. Alice hears a message like "Your correspondent is starting a collaboration session. Please wait for the communication to complete." After a few seconds, Alice's call manager pops up an alert: "Your correspondent is requesting to launch your web browser. Do you want to open it now? Launch/Cancel?" Alice clicks on "Launch." A web browser pops up and she connects to the web conferencing session where Bob is waiting for her.

Those skilled in the art will recognize that the example of FIG. 4 represents the simplest of cases, and that the invention includes a variety of alternate embodiments. Alternate embodiments of the invention are described in more detail below with reference to FIG. 8-11.

Allowing phone URL exchange between a human user and an automated attendant has a wide range of applications such as customer services and advertising business. Using the Alice-Bob example described above for the embodiment of phone URL exchange between a human user (e.g., Alice) and an automated attendant of a company called ACME, Alice has a PURLX unit and a smart phone (or a phone and a computer). She connects to ACME's phone system to get support information on a microwave she purchased. Alice is sent to a phone queue by an automated attendant on ACME end. While Alice waits, she can either be prompted to receive information (e.g., a URL) or have the information sent to her directly using the PURLX mechanism described above. Alice's PURLX unit decodes the information and sends the decoded information to the application layer which prompts Alice to open the web browser at the URL provided. Depending on which number Alice called, or which selection she made with the automated attendant, Alice can have different types of information. For example, the information is a URL which points to a frequently-asked-questions (FAQ) web page for her microwave. In some cases the URL provides a form in which Alice may submit additional information via the web to assist ACME in meeting her needs, such as her current address and the best time for a service call.

Another application of phone URL exchange between a human user and an automated attendant is advertising business. Similar to pop-up advertisement commonly seen in a user's computer while the user browses the web. The PURLX system described above provides a framework for a similar method of advertisement via a telephone. The advertising provided by the PURL system is less intrusive than a standard sale call since all the information (e.g., URL) is out-of-band. In the example above, Alice calls ACME and the ACME system may push to Alice via the PURLX system new product information and advertisements about her microwave and ACME's new microwave product line. In a similar embodiment of the invention, the automated attendant performs more advanced operations such as identifying the caller using a caller ID mechanism, authenticating the caller with a pin or a password, and performing actions—such as transferring or emailing of files from the caller office computer to a specific or pre-defined email account.

Methods

Figure 5:
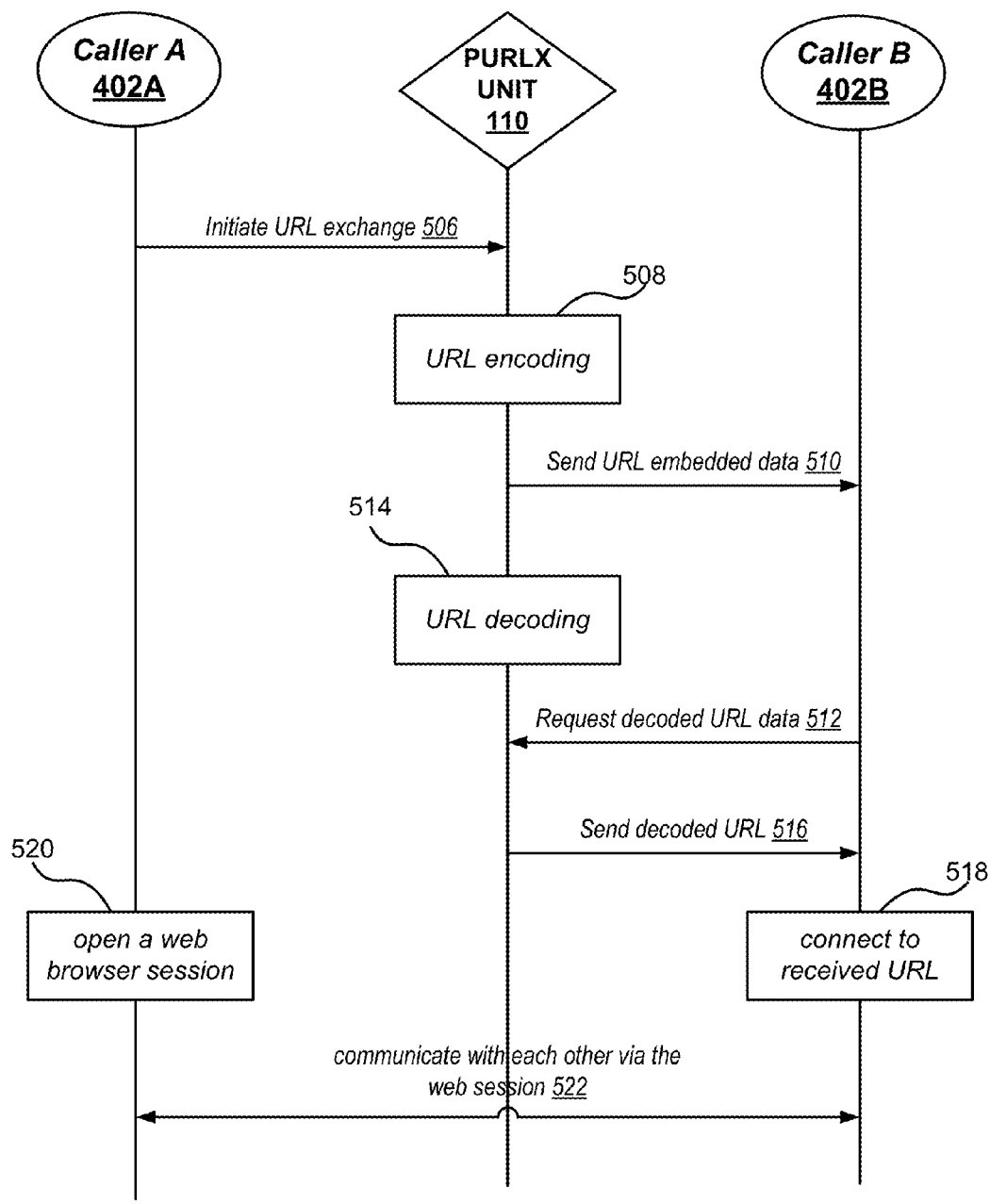
FIG. 5 is a trace diagram illustrating a process for phone URL exchange using a PURLX unit according to one embodiment of the present invention.

Referring now to FIGS. 5-6 and 7A-B, methods for performing a phone URL exchange are shown. FIG. 5 is a flow chart illustrating an example of phone URL exchange using the PURLX engine 260 according to one embodiment of the invention. For purposes of simplicity, only one PURLX unit 110 is illustrated in FIG. 5. The PURLX unit 110 should be interpreted as the PURLX unit 110A responsive to operations associated with caller 402A. The PURLX unit 110 should be interpreted as the PURLX unit 110B responsive to operations associated with caller 402B.

Initially, a first caller 402A initiates 506 phone URL exchange by sending a phone URL exchange signal to the PURLX unit 110. The PURLX unit 110 determines the information to be sent and URL encoding method and encodes 508 the URL into audio data or as a part of the communications control signals. The PURLX unit 110 sends 510 the audio data or the communications control signals embedded with the URL to a second caller 402B. The PURLX unit 110 decodes 514 the URL embedded in the audio data or in the communications control signals, and the second caller 402B sends 512 a request to the PURLX unit 110 for the decoded URL data. The PURLX unit 110 sends 516 the decoded URL to the second caller 402B. The first caller opens 520 a web conferencing session at the URL exchanged, and the second caller connects 518 to the received URL to join the web conferencing session. The first caller 402A and the second caller 402B communicate 522 with each other via the web conferencing session at the exchanged URL.

Figure 6:
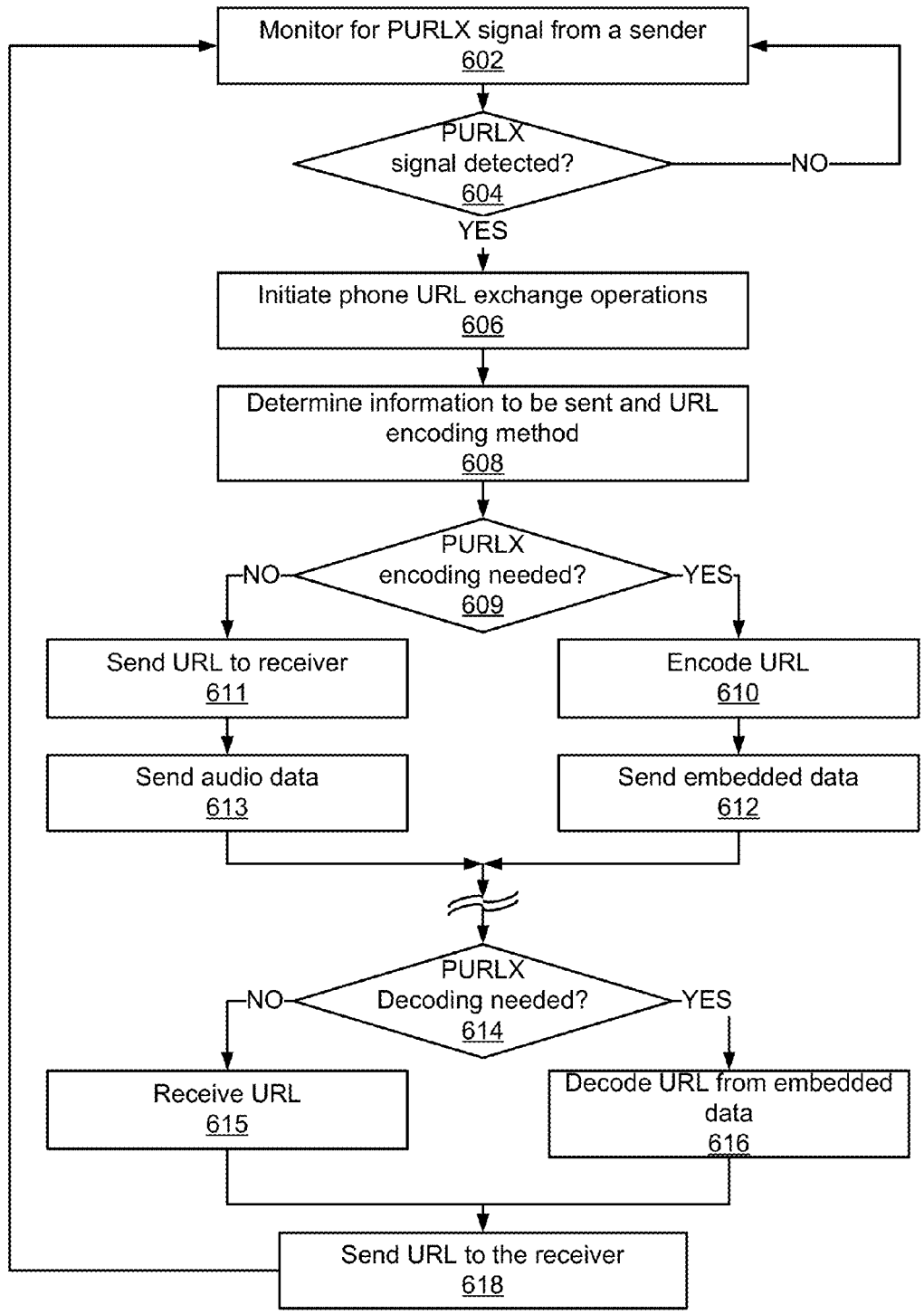
FIG. 6 is a flowchart illustrating a process performed by a PURLX engine according to one embodiment of the present invention.

FIG. 6 is a flowchart illustrating a process performed by the PURLX engine 260 according to one embodiment of the invention. In particular, FIG. 6 shows a general method performed when one PURLX unit 110 performs both the encoding and decoding functions similar to the process described above with reference to FIG. 5. The method begins by monitoring 602 for a PURLX signal from a sender by the PURLX monitoring module 300 of the PURLX engine 260. Responsive to no PURLX signal being detected, the PURLX engine 260 loops back to step 602 to continue to monitor for the PURLX signal from a sender. Responsive to a PURLX signal being detected 604, the PURLX engine 260 initiates 606 the phone URL exchange operation by the initialization module 310. The PURLX engine 260 determines 608 the information to be sent and URL encoding method using the configuration determination module 320. Next, the method determines 609 whether PURLX encoding is needed. If so, the PURLX engine 260 encodes 610 the URL to be exchanged by the PURLX encoding module 330 and sends 612 the embedded audio data or communications control signals to its intended recipient. If PURLX encoding is not needed, the PURLX engine 260 sends 611 the URL to the receiver, for example out of channel, and then sends 613 the audio data, for example, in channel.

Responsive to the recipient receiving audio data or the communications control signals, whether encoded or not, the method determines 614 whether decoding is needed. For example, this may be in response to a PURLX decoding request received from a receiver of the embedded audio data. If the PURLX engine 260 determines that decoding is needed, the PURLX engine 260 decodes 616 the embedded audio data by using the PURLX decoding module 350 and sends 618 the URL to the receiver through the gateway interface module 340 of the PURLX engine 260. If no PURLX decoding is needed, the PURLX engine 260 receives 615 the URL from the sender and sends 618 the URL to the receiver through the gateway interface module 340 of the PURLX engine 260. Once the URL has been sent to the receiver, the PURLX engine 260 continues monitoring for next PURLX signal from a sender and returns to step 602.

FIGS. 7A-7B are flowcharts illustrating methods performed by two endpoints using the PURLX engine 260 according to one embodiment of the invention. FIG. 7A is a flowchart of a phone URL sender using the PURLX engine 260 according to one embodiment of the invention. Initially, a phone URL sender (e.g., caller 402A) sends 702 a web session request to a receiver over a phone line. The caller 402A receives 704 an acknowledgement from the receiver. The caller 402A requests 706 a phone URL exchange by pressing a special key on his/her keypad. The caller 402A waits 708 for the PURLX engine 260 to encode the URL and the receiver to connect to the URL exchanged. Upon the receiver connecting to the URL exchanged, the caller 402A opens 710 a web conferencing session at the URL exchanged and communicates 712 with the URL receiver.

FIG. 7B is a flowchart of a phone URL receiver (i.e., a phone URL callee) using the PURLX engine 260 according to one embodiment of the invention. Initially, the phone URL callee (e.g., caller 402B) receives 732 a phone URL exchange request from a sender (e.g., caller 402A). Caller 402B optionally checks 734 whether his/her phone is phone URL exchange capable. Responsive to the phone not capable of exchanging URLs over a telephone line ("NO"), caller 402B cancels the request, notifies the requestor application, and does not join the web session and returns to step 732 for next phone URL request. Responsive to the phone capable of exchanging URLs over a telephone line ("YES"), caller 402B sends 736 a PURLX acknowledgement to a phone URL request sender. The type of data being sent in the PURLX acknowledgement is associated with the PURLX request to guarantee the phone URL exchange flexibility. The type of data being sent in the PURLX acknowledgement, in one embodiment, is web session data. The caller 402B receives 738 an embedded audio data and sends a request 740 to the PURLX engine 260 for decoding the embedded audio data. The caller 402B receives 742 the decoded URL from the PURLX engine 260 and connects 744 to the received URL. The caller 402B communicates 746 with the phone URL sender (i.e., caller 402A) via the web conferencing session at the received URL.

Referring now to FIG. 8, an example of a smart phone 124 having a PURLX engine 262 according to one embodiment of the invention is shown. The smart phone 124 comprises a processor 210, a web browser 820, an application interface 830 and an embodiment of the PURLX engine 262. The smart phone 124 sends and receives data streams 391 though the application interface 830. The smart phone 124 communicates with a PURLX decoding device 840. The PURLX decoding device 840 includes the gateway/phone interface module 340, the PURLX decoding module 350 and the interface module 360 with the same or similar functionality as has been described above with reference to FIG. 3A. The processor 210 can be a conventional processing device, such as a general-purpose microprocessor. The web browser 820 can be a conventional web browsing application. The application interface 830 triggers the sending of a URL embedded in audio data or communications control signals, and passes the received data stream 391 to the PURLX engine 262 for further processing. The application interface 830 also uses the web browser 820 to open the URL decoded by the PURLX engine 262.

The PURLX engine 262 in FIG. 8 comprises a PURLX monitoring module 300, an initialization module 310, a configuration determination module 320, and a PURLX encoding module 330. In another embodiment, the PURLX engine 262 also includes the user contact information table 370. Comparing with the PURLX engine 260 of the PURLX unit 110 described in conjunction with FIG. 2 and FIG. 3A, this embodiment of the PURLX engine 262 illustrated in FIG. 8 has three components (i.e., gateway/phone interface module 340, PURLX decoding module 350 and interface module 360) distributed to the PURLX decoding device 840 communicatively coupled to the smart phone 124. These modules/components cooperate together to provide the same functionality of the invention as that described above with reference to FIGS. 3-4. Having the PURLX engine 262 inside the smart phone 124 enables the smart phone 124 to detect a phone URL exchange signal, to initiate the phone URL exchange operations, to determine information to be sent and URL encoding method and to encode the URL to be exchanged. Upon receiving an embedded audio data or the communications control signals, the smart phone 124 is also able to communicate with the PURLX decoding device 840 that decodes the embedded audio data or the communications control signals, communicate with a web server, launch a web browser and connect to the decoded URL for web-based communications with the URL sender. In another embodiment, the smart phone 124 can have a PURLX engine 262 that is same as the PURLX engine 260 in FIG. 3A that includes the modules 300, 310, 320, 330, 340, 350, 360 and 370. The operation of these modules 300, 310, 320, 330, 340, 350, 360 and 370 can also be better understood with reference to FIGS. 3 and 4 above.

Figure 9:
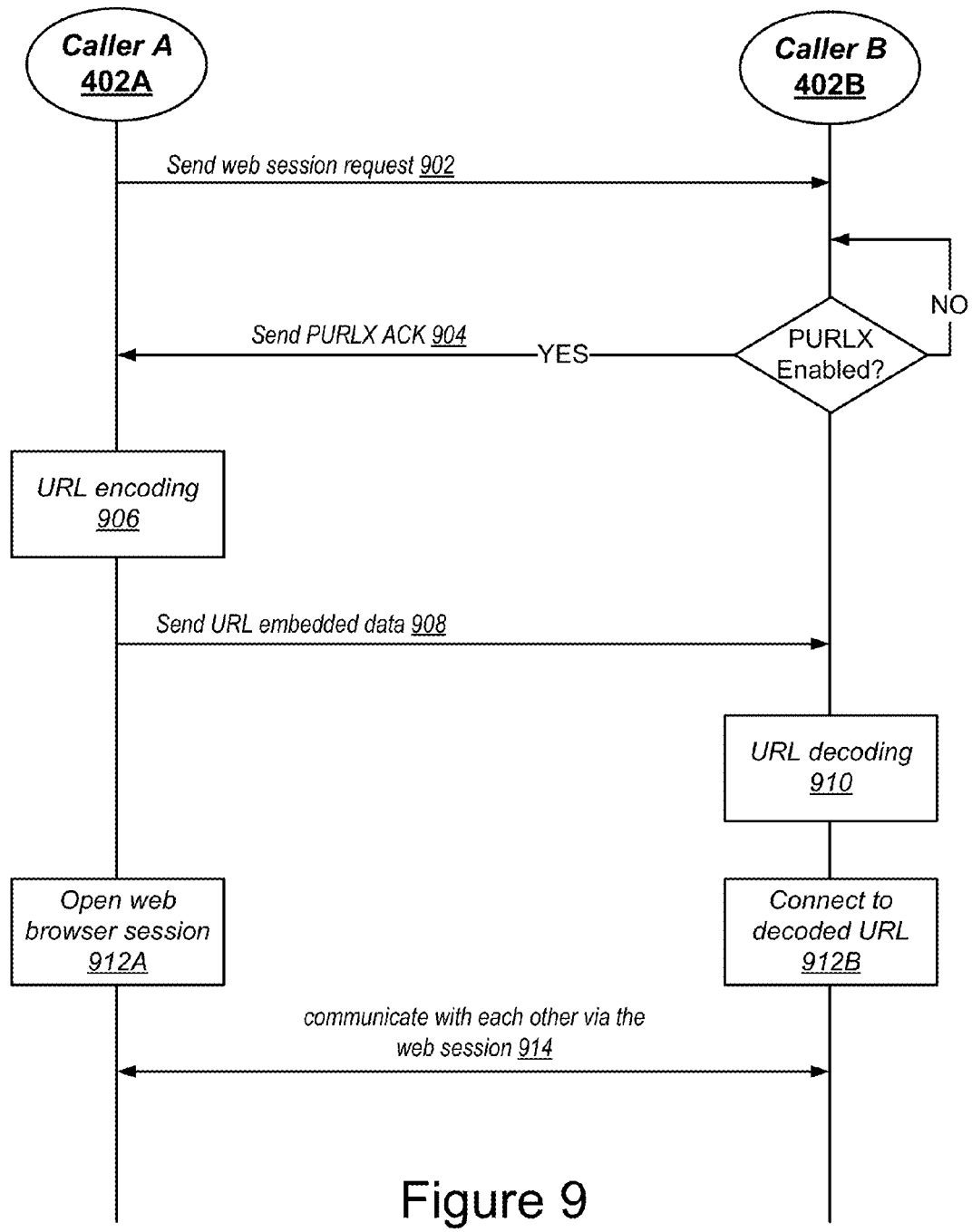
FIG. 9 is a trace diagram illustrating a phone URL exchange using the PURLX engine of FIG. 8 according to one embodiment of the present invention.

FIG. 9 is a flow chart illustrating a method of phone URL exchange using the PURLX engine 262 of FIG. 8 according to one embodiment of the present invention. Initially, caller 402A uses his/her smart phone 124 to send 902 a web session request to caller 402B. Caller 402B checks whether his/her phone is capable of exchanging URLs over a telephone line. Responsive to his/her phone being incapable of phone URL exchange, caller 402B does not join the web session. Responsive to his/her phone being capable of phone URL exchange, caller 402B uses his/her smart phone 124 to send back 904 a PURLX acknowledgement to caller 402A. Caller 402A uses his/her smart phone 124 to determine the URL to be exchanged and URL encoding method and encode 906 the URL into audio data or as a part of the communications control signals. Caller 402A sends 908 the embedded audio data or the communications control signals to caller 402B. Upon receiving the embedded audio data or the communications control signals, caller 402B uses his/her smart phone 124 to decode 910 the embedded audio data or the communications control signals and connect 912B to the decoded URL for web-based communications with caller 902A. Caller 402A also opens 912A a web browser session at the URL exchanged. Caller 402A and caller 402B communicate 914 with each via the web browser session at the URL exchanged.

Figure 10:
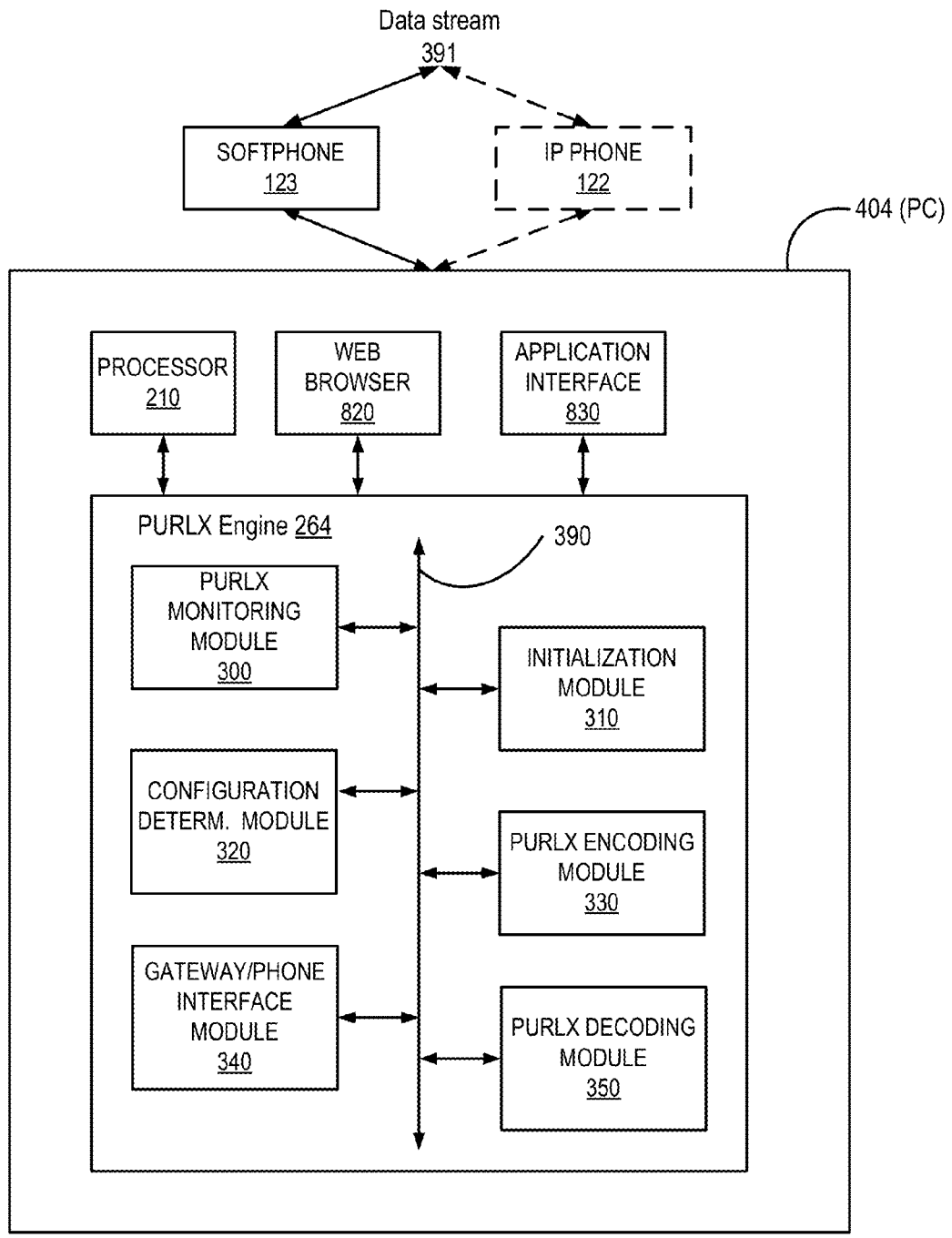
FIG. 10 is a block diagram showing a computer having a PURLX engine according to one embodiment of the present invention.

FIG. 10 is a functional block diagram showing an example of a computer (e.g., a PC 404) having a PURLX engine 264 according to one embodiment of the invention. The PC is communicatively coupled to a softphone 123 (in solid line) or an IP phone 122 (in dashed line), which sends and receives data streams 391. The PC 404 comprises a processor 210, a web browser 820, an application interface 830 and an embodiment of the PURLX engine 264. The processor 210 can be a conventional processing device, such as a general-purpose microprocessor. The web browser 820 can be a conventional web browsing application. The application interface 830 interfaces with the softphone 123 or IP phone 122 and the PC 404. The application interface 830 triggers the sending URL embedded in audio data or communications control signals to the softphone 123 or the IP phone 122, and passes the received data stream 391 to the PURLX engine 264 for further processing. The application interface 830 also uses the web browser 820 to open the URL decoded by the PURLX engine 264.

The PURLX engine 264 in FIG. 10 comprises a PURLX monitoring module 300, an initialization module 310, a configuration determination module 320, a PURLX encoding module 330, a PURLX gateway/phone interface module 340 and a PURLX decoding module 350. In other embodiments, the PURLX engine 264 also includes the user contact information table 370. Comparing with the PURLX engine 260 of the PURLX unit 110 described in conjunction with FIG. 2 and FIG. 3A, the embodiment of the PURLX engine 264 illustrated in FIG. 10 does not have two components (i.e., interface module 360 and the user contact information table 370). In one embodiment, the functionality of the interface module 360 is performed by the application interface 830. These modules/components cooperate together to provide the same functionality of the invention as that described above with reference to FIGS. 3-4. Having the PURLX engine 264 inside the PC 404 enables a telephone such as an IP phone 122, a softphone 123 or a smart phone 124 connected with the PC 404, to detect a phone URL exchange signal, initiate the phone URL exchange operations, determine information to be sent and URL encoding method and to encode the URL to be exchanged. Upon receiving an embedded audio data, the PC 404 is able to decode the embedded audio data or the communications control signals, communicate with a web server, launch a web browser and connect to the decoded URL for web-based communications with the URL sender. In another embodiment, the PC 404 can have a PURLX engine 264 that is same as the PURLX engine 260 in FIG. 3A that includes the modules 300, 310, 320, 330, 340, 350, 360 and 370. The operation of these modules 300, 310, 320, 330, 340, 350, 360 and 370 can also be better understood with reference to FIGS. 3 and 4 above.

Figure 11:
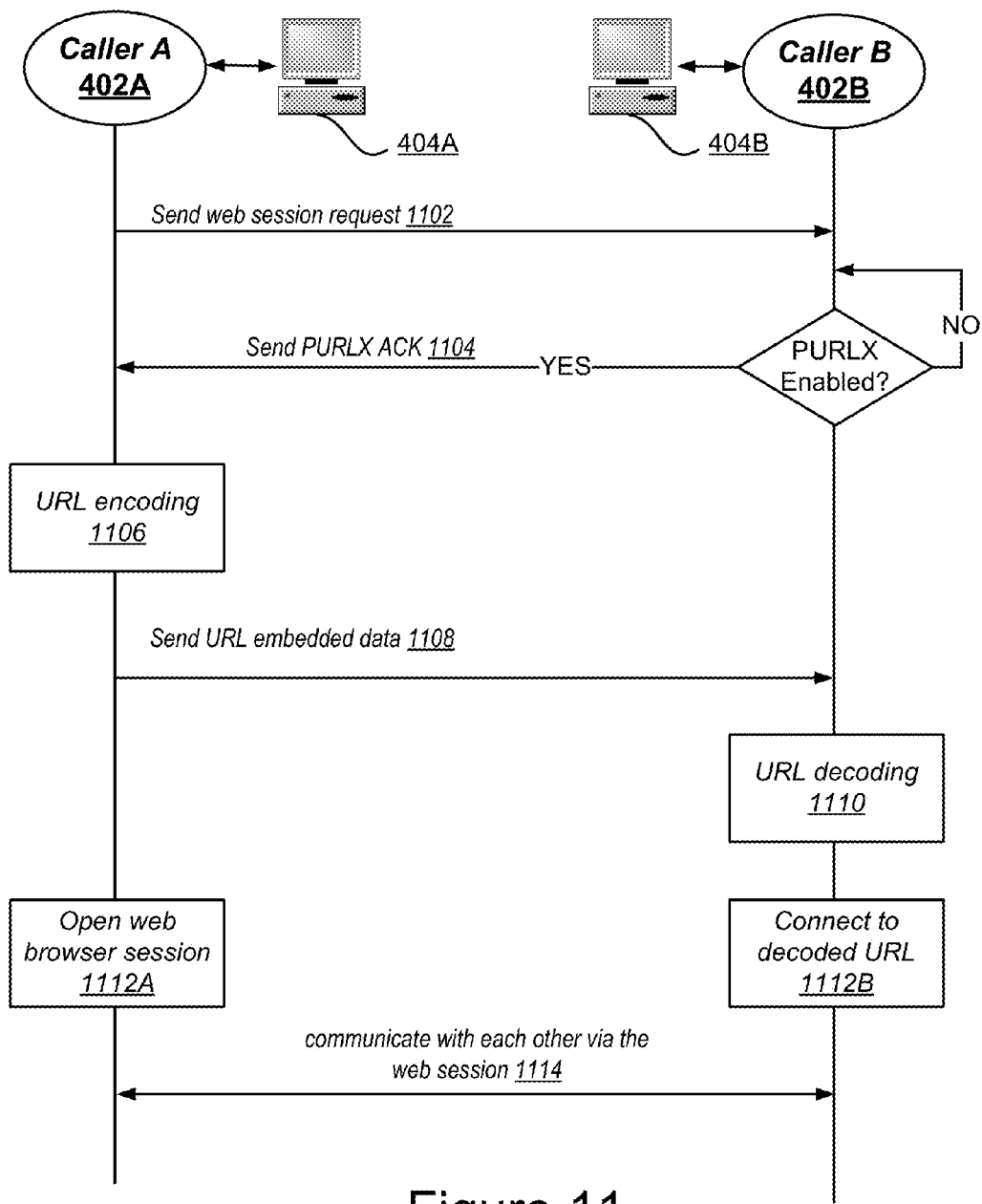
FIG. 11 is a trace diagram illustrating a phone URL exchange using the PURLX engine of FIG. 10 according to one embodiment of the present invention.

FIG. 11 is a flow chart illustrating an example of URL exchange using the PURLX engine 264 of FIG. 10 according to one embodiment of the invention. Caller 402A has an IP phone coupled to a PC 404A and caller 402B has an IP phone coupled to a PC 404B. PC 404A and 404B implement the PURLX engine 264 illustrated in FIG. 10. Initially, caller 402A sends 1102 a web session request to caller 402B. Caller 402B checks whether his/her phone is capable of exchanging URLs over a telephone line. Responsive to his/her phone being incapable of phone URL exchange, caller 402B does not join the web session. Responsive to his/her phone being capable of phone URL exchange, caller 402B sends back 1104 a PURLX acknowledgement to caller 402A. Caller 402A uses his/her PC 404A to determine the URL to be exchanged and to encode 1106 the URL into audio data or as a part of the communications control signals. Caller 402A sends 1108 the embedded data (e.g., audio data or the communications control signals) to caller 402B. Upon receiving the embedded data, caller 402B uses his/her PC 404B to decode 1110 the embedded data and connect 1112B to the decoded URL for web-based communications with caller 902A. Caller 402A also opens 1112A a web browser session at the URL exchanged. Caller 402A and caller 402B communicate 1114 with each via the web browser session at the URL exchanged.

Those skilled in the art will recognize that the example of FIGS. 5, 9 and 11 represent some of a variety of alternate embodiments. FIG. 5 represents a flow chart of two endpoints (e.g., caller 402A and caller 402B) exchanging a URL over a telephone communications channel through two PURLX units 110 (i.e., PURLX unit 110A and PURLX unit 110B) separate from the two endpoints. FIG. 9 represents a flow chart of two endpoints (e.g., caller 402A and caller 402B) exchanging a data such as URL over a telephone communications channel, where each endpoint implements a PURLX engine within the endpoint itself. FIG. 11 represents a flow chart of two endpoints (e.g., caller 402A and caller 402B) exchanging a URL over a telephone communications channel in conjunction with a computer which implements a PURLX engine. Other embodiments may include an endpoint connected with a computer as illustrated in FIG. 11 exchanges a URL over a telephone communications channel with an endpoint as illustrated in FIG. 9, or vice versa.

Figure 12:
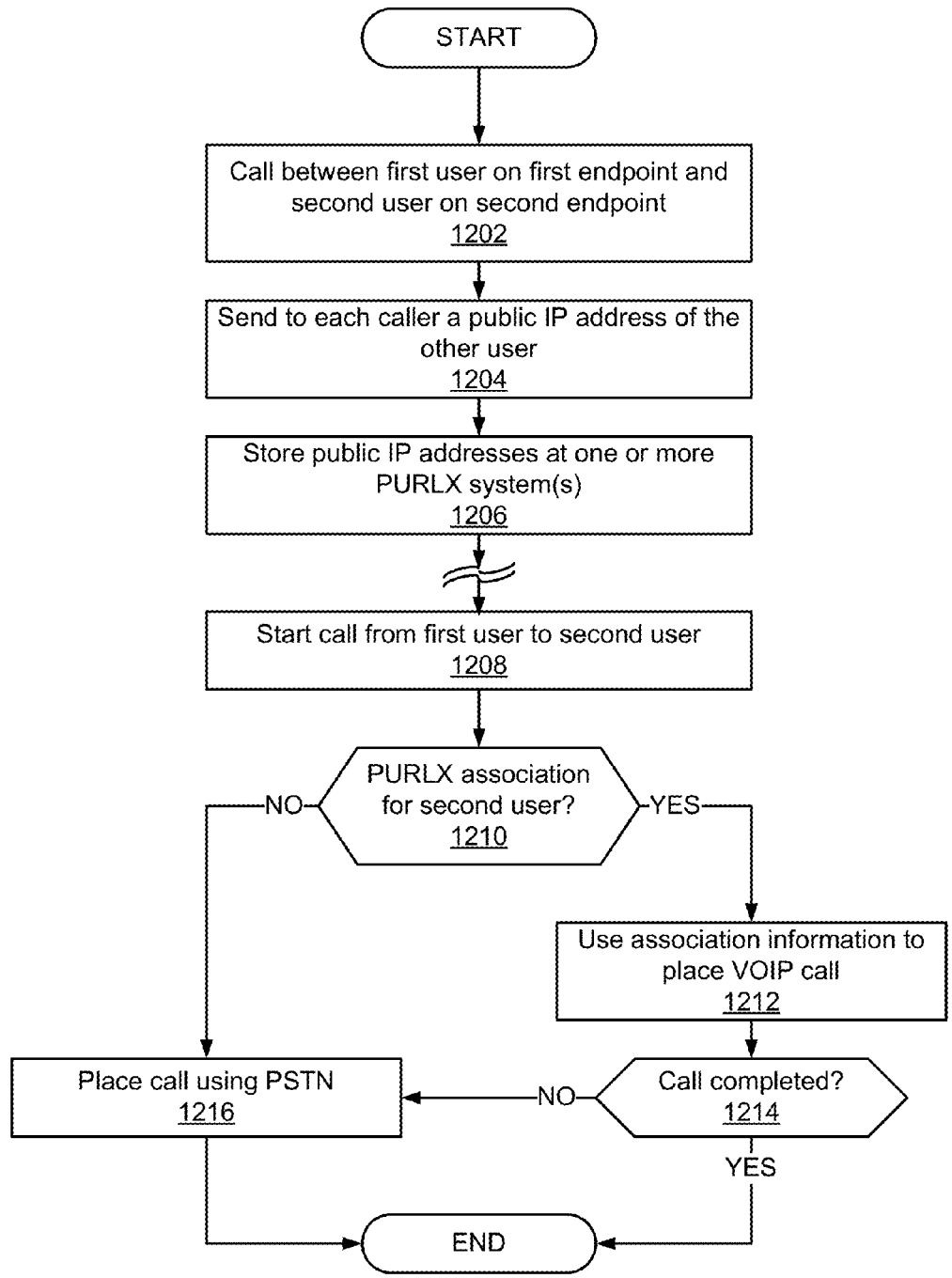
FIG. 12 is a flowchart illustrating a method for placing an IP telephone call using an information exchange unit with failover according to an embodiment of the present invention.

Referring now to FIG. 12, a method for placing an IP telephone call using a PURLX unit 110 with failover according to the first embodiment of the present invention is described. The method begins with a call 1202 between a first user using the first endpoint and a second user using the second endpoint. Those skilled in the art will recognize that this call could be over a PSTN network 180 or an IP network 190. It should be understood that: 1) a PURLX unit 110 is associated with the first endpoint; 2) a PURLX unit 110 is associated with the second endpoint; or 3) a first PURLX unit 110A is associated with the first endpoint and a second PURLX unit 110B is associated with the second endpoint. The method continues by sending 1204 a public IP address of the user to the other user. For example, the public IP address of the first user is sent to the second endpoint and the public IP address of the second user is send to the first endpoint. Next the method stores 1206 the public IP addresses at one or more PURLX units 110. In some embodiments, the method preferably stores the public IP addresses in the user contact information table 370 of the PURLX engine 260. For example, if there is only a PURLX unit 110 associated with the first endpoint, that PURLX unit 110 stores the public IP address of the first user and the public IP address of the second user. Similarly, if there is only a PURLX unit 110 associated with the second endpoint, it stores the public IP address of the first user and the public IP address of the second user. Finally, if there is both a first PURLX unit 110A and a second PURLX unit 110B, then both PURLX units 110A, 110B stores the public IP address of the first user and the public IP address of the second user. Once these three steps 1202, 1204 and 1206 have been performed, the system 195 is prepared for initiating IP communication. In one embodiment, these steps are performed by populating one or more fields of the user records 288 for the users in the user contact information table 370. The present invention is particularly advantageous because the PURLX unit 110 captures the information necessary for IP communication automatically. There is no need for a middleman in terms of a clearinghouse or authorization server. Once two users have called each other, the information exchange unit 110 automatically and without requiring user input captures the information necessary for future calls between these two users to be made using the IP network 190.

Sometime after step 1206 as indicated by the parallel lines between step 1206 and 1208, the call is initiated 1208 between a first user and the second user. Next, one or more PURLX units 110 determine 1210 whether there is a PURLX association for the second user. In one embodiment, this is determined by the PURLX engine 260 determining whether there is an entry or record 288 for the second user in the user contact information table 370. If so, the PURLX engine 260 uses 1212 the association information in the user contact information table 370 to place a VIOP call from the endpoint being used by the first user to the endpoint being used by the second user. Those skilled in the art will recognize that the information from the user contact information table 370 can be used to establish an IP telephony call or other IP communication between the first user in the second user using any one of the methods described such as to establish a web session, or for direct IP communication from specified device to device. Next, the PURLX engine 260 determines 1214 whether the IP telephony call was successfully completed. If so, the method is complete and ends. If the IP telephony call was not successfully completed or in step 1210 the PURLX engine 260 determines that there was not an association for the second user, the method proceeds to step 1216. In step 1216, the method completes the call from the first user to the second user using the PSTN 180 in a conventional manner.

Figure 13A:
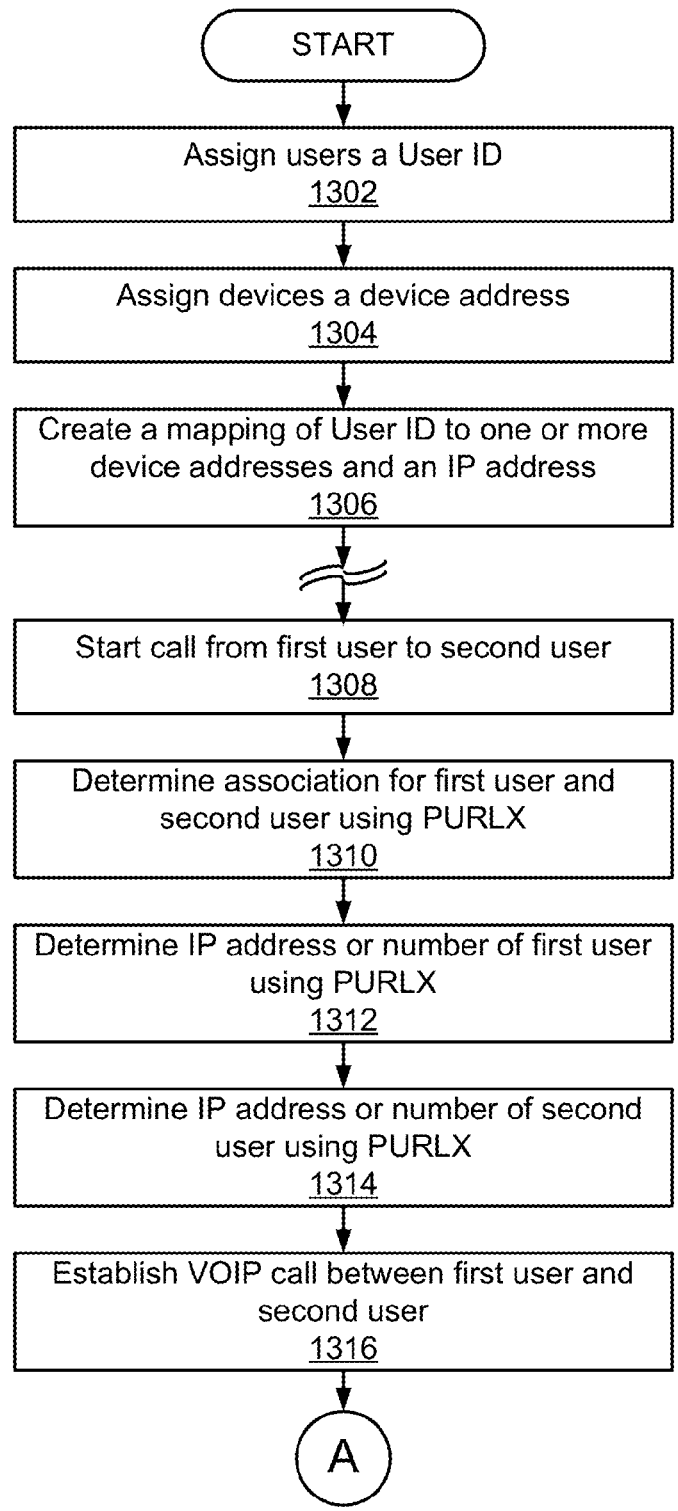
FIGS. 13A and 13B are a flowchart illustrating a method for IP communication using an information exchange unit with failover according to another embodiment of the present invention.
Figure 13B:
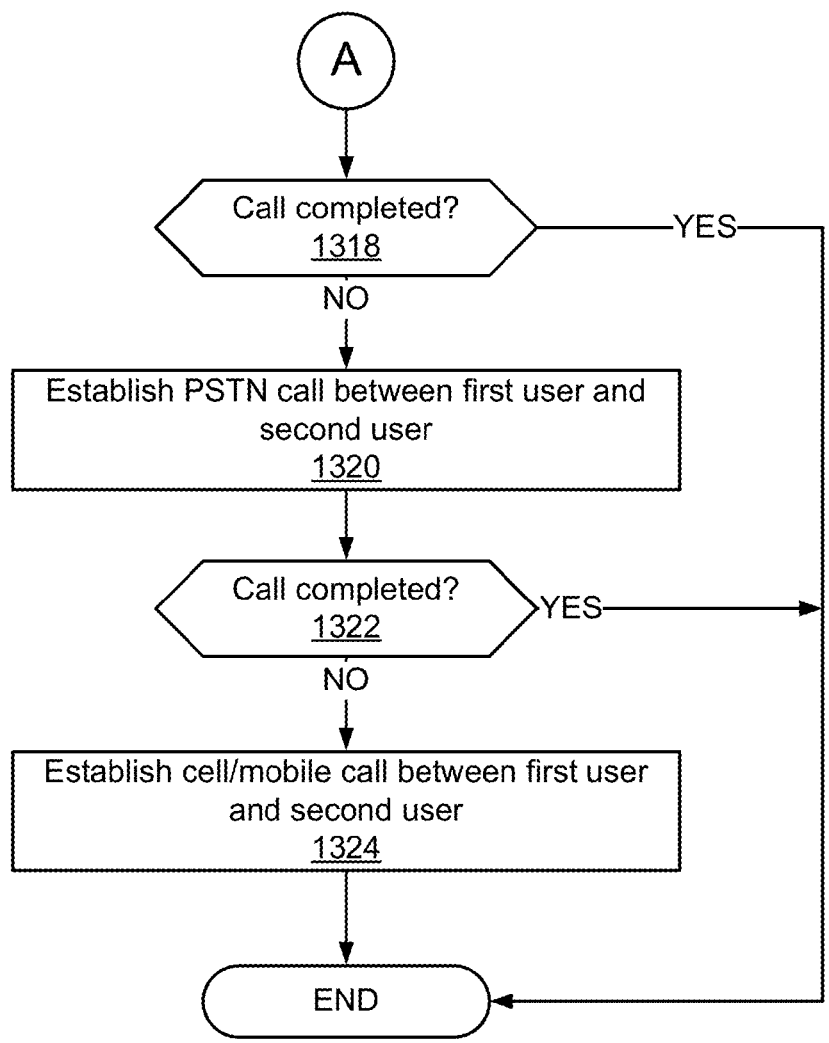

Referring now to FIGS. 13A and 13B, a method for IP communication using a PURLX unit with failover according to a second embodiment of the present invention is described. The method begins by assigning 1302 a user ID to each user. In one embodiment, this is performed by the IP telephony system when the user is given an extension. In another embodiment, the user IDs are unique across a plurality of PURLX units 110 so that IP information associated with each user can be maintained without risk of two users having the same identification number. Next, the system 195 assigns or retrieves 1304 an IP address or device address for the devices associated with each user. In a first embodiment, each device is assigned an IP address and the information exchange unit 110 handles the management of these assigned IP addresses. In this embodiment, the information exchange unit 110 uses the assigned IP addresses to identify devices and is responsible for the translation of the assigned IP addresses to the physical addresses. This is particularly advantageous because in cases where devices do not have static IP addresses but share IP addresses. In a second embodiment, the information exchange in a 110 manages the device addresses or uses pre-existing device information. For example, each device such as a phone, a soft phone, a personal computer, or a mobile phone has a device address such as provided by its manufacturer. For those devices that do not have device addresses assigned by their manufacturer, the system 195 of the present invention assigns them unique device addresses that are used for establishing IP communication between users. Next, the method creates 1306 a mapping of user IDs to one or more device addresses and an IP address. In one embodiment, this mapping is merely the creation of the record in the user contact information table 370 as has been described above with reference to FIGS. 3A and 3B. More specifically, a record 388 is created for the user including completion of the username field 380, user ID field 381, user phone number field 382, IP information field 383 and at least one device address field 385, 386 or 387. The creation of a record 388 allows future communications to be performed across the IP network 190. Sometime after step 1306, a call 1308 is initiated from a first user to second user. Next, the system 195 determines 1310 whether there is an association for the first user and the second user using the PURLX unit 110. In one embodiment, this is performed by searching the user contact information table 370 for IP information corresponding either to the first user or the second user. The method continues by determining 1312 the IP address and/or number of the first user using the PURLX unit 110. Then the method determines 1314 the IP address or number of the second user using the PURLX unit 110. Next the PURLX unit 110 attempts to establish 1316 an IP telephony call between a first user and the second user. Since the user contact information table 370 includes a public IP address of the user and at least one device address of the user, this information can be used in establishing the IP telephony call between two users. The method continues in step 1318 of FIG. 13B to determine whether the IP telephony call was completed. If so, the method is complete and ends. If not, the method attempts to establish 1320 a PSTN call between the first user and the second user. Then the method determines 1322 whether the PSTN call was completed. If so, the method is complete and ends. If not, the method then attempts to establish 1324 a cellular or mobile call between the first user and the second user. Those skilled in the art will recognize that the order of steps 1320 and 1324 could be reversed according to preferences of the user as to the ordered that different endpoints should be selected or according to an order prescribed by an administrator or a company.

Figure 14:
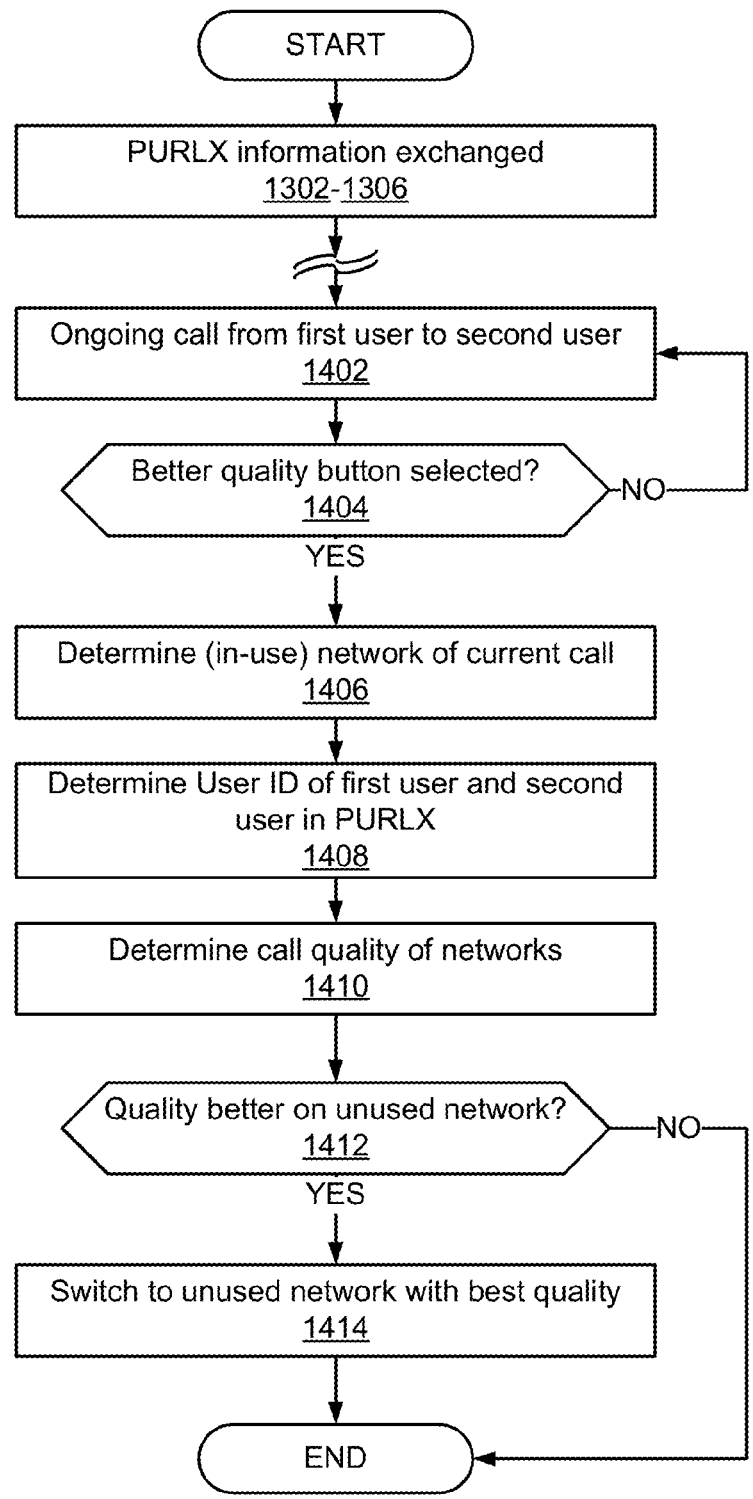
FIG. 14 is a flowchart illustrating a method for improving call quality using an information exchange unit according to one embodiment of the present invention.

Referring now to FIG. 14, a method for improving call quality using a PURLX unit 110 according to one embodiment of the present invention is described. The method begins by exchanging IP information using PURLX units 110 as has been described above. For example, this includes performing steps 1302, 1304 and 1306. Next a call between a first user in a second user is established 1402 and is ongoing. The method determines 1404 whether the better quality button has been selected by either user. If not, the method returns to step 1402 and continues the call. On the other hand, if a user has selected the better quality button, it is detected by the PURLX unit 110, such as by the PURLX and monitoring module 300. Next, the PURLX unit 110 determines 1406 the network that is being used for the call between the first user and the second user. Next the method determines 1408 the user ID and other IP communication information of the first user and the second user in the PURLX unit 110. For example, this includes retrieving records 288 from the user contact information table 370 for the first user and the second user. Next, the method determines 1410 the call quality for the networks that are not in use. In one embodiment, this is call quality determined by statistical measurement. In another embodiment, call quality can include user preference. For example, a user may have previously determined that the quality is better on a particular network, even though the statistics collected by the system do not indicate that to be the case. If the network's statistical information is the same or better than when the user indicated it as a preferred network, and other networks were not chosen as preferred and their statistics have not improved, the network indicated as better quality by the user is selected. In this example, there three possible networks: the IP network 190, the PSTN network 180, and the mobile or cellular network (not shown). The quality of calls on these networks can be retrieved on a real-time basis from the call manager 150 or the networks themselves. Next the method determines 1412 whether the call quality is better on an unused network compared to the call quality for the networking use as determined in step 1406. If the call quality on an unused network is not better than the current network in use, the method is complete and ends. However, if the call quality on an unused network is better than the network currently in use, the PURLX unit 110 switches 1414 the call to the network with the highest quality, and after step 1414, the method is complete and ends. It should be understood that better call quality here is used to refer to any improvement in at least one attribute of the connection between the users. For example, better quality may be a network that provides less voice quality but better quality or less latency in presenting video or presentations.

The system may choose an alternative that the user thinks is worse. So, if there are multiple networks, and the user presses Better Quality a $2^{nd}$ time, we note in the table the statistics of the rejected networks and try another. The user may press Better Quality a number of times during a call. Then on a new call, we can use the previous preferences by the users. It should be understood that in one embodiment of the invention, the networks that have been rejected for poor quality are recorded in a rejected network list. This list can be used to determine user preferences for networks. For example, after a call has been switched from a first network to a second network, the first network is recorded on a rejected network list. When the user selects the call quality button a second time, the call is switched to a new network other than networks on the rejected network list. Additionally for future calls, the rejected network list is used to avoid those networks. For example, in initiating a second call, the system selects a new network for the second call; determines whether the new network is on the rejected network list; and if the new network is on the rejected network list, selecting another new network for the second call that is not on the rejected network list. This is particularly advantageous because the users at each end of a call may have a different idea of better quality. The selection of the better quality button is a vote for only the received voice data. If there is a conflict between input from the endpoints, the voice stream is split and each user may choose the receiving data network. This is actually a common problem because the network is asymmetrical and quality can be good in one direction but not in the other.

In the methods described above, the determination of the quality of a call and the switching of the call from one network to another network can utilize not only the methods and systems disclosed in this present application but also those disclosure in U.S. patent application Ser. No. 12/053,809, filed Mar. 24, 2008 entitled "PSTN Bypass for IP Media;" U.S. patent application Ser. No. 12/651,330, filed Dec. 31, 2009 entitled "User Activated Bypass for IP Media;" and U.S. patent application Ser. No. 12/980,847, filed Dec. 29, 2010 entitled "Cloud VoIP System with Bypass for IP Media;" all of which are incorporated herein by reference.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims of this application. As will be understood by those familiar with the art, the invention may be embodied in other specific forms without departing from the spirit or essential characteristics thereof. Likewise, the particular naming and division of the modules, routines, features, attributes, methodologies and other aspects are not mandatory or significant, and the mechanisms that implement the invention or its features may have different names, divisions and/or formats. Furthermore, as will be apparent to one of ordinary skill in the relevant art, the modules, routines, features, attributes, methodologies and other aspects of the invention can be implemented as software, hardware, firmware or any combination of the three. Also, wherever a component, an example of which is a module, of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the invention is in no way limited to implementation in any specific programming language, or for any specific operating system or environment. Accordingly, the disclosure of the invention is intended to be illustrative, but not limiting, of the scope of the invention, which is set forth in the following claims.

What is claimed is:

1. An apparatus comprising:
a processor configured for communication over a communications channel with a first endpoint of a first user and a second endpoint of a second user;
a table for storing information about the first user and the second user including a first association between the first user and one or more endpoint device addresses and a second association between the second user and one or more endpoint device addresses, the table coupled for communication with the processor;
a monitoring module for automatically capturing the first association and the second association in response to receiving a request to establish communication between the first user and the second user, the monitoring module coupled for storing the first association and second association in the table; and
an exchange engine for establishing the communication as an Internet Protocol (IP) communication between the first user and the second user using information from the table, the exchange engine coupled to retrieve information from the table and store information in the table, the exchange engine coupled to the processor for communication with the first endpoint and the second endpoint.

2. The apparatus of claim 1, wherein the IP communication is one from the group of IP telephony, instant messaging, chat, presence, data collaboration, presentation sharing, desktop sharing, application sharing, whiteboard sharing, editable document sharing with audit trails, video, email, voicemail and short message services.

3. The apparatus of claim 1, wherein the apparatus is integrated into one from a group of a phone, a gateway and a computer server.

4. The apparatus of claim 1, wherein the exchange engine comprises:
a monitoring module configured to receive a phone Uniform Resource Indicator (URI) exchange request and audio data from a first endpoint;
a phone interface module configured to determine one or more URIs to be sent based on the phone URI exchange request, the phone interface module communicatively coupled with the monitoring module and the table; and
an interface module configured to send the audio data to the second endpoint over the communications channel, to send a first URI to the first endpoint and a second URI to the second endpoint, the interface module communicatively coupled with the phone URI interface module and the processor.

5. The apparatus of claim 4, further comprising:
a configuration determination module configured to determine an encoding method based on the phone URI exchange request, the configuration determination module communicatively coupled with the monitoring module; and a phone URI encoding module configured to encode the first URI and the second URI using the determined encoding method, the phone URI encoding module communicatively coupled with the phone interface module and with the configuration determination module.

6. The apparatus of claim 5, wherein the URI is encoded into the audio data using the determined encoding method.

7. The apparatus of claim 5, wherein the encoding method is an ASCII Binary encoding method, wherein the apparatus is configured to convert the determined URI from ASCII format to Binary Coded Decimal format, and the converted URI is part of the audio data.

8. The apparatus of claim 5, wherein the encoding method describes a methodology to encode the determined URI and a signaling scheme for sending the determined URI.

9. The apparatus of claim 8, wherein the signaling scheme is one of Multi-Frequency Tone (MF) and Dual-Tone, Multi-Frequency (DTMF).

10. The apparatus of claim 8, wherein the signaling scheme is one of Caller ID while Call Waiting and Analog Display Signaling Interface (ADSI).

11. The apparatus of claim 5, wherein the encoding method is a steganography method, wherein the apparatus is configured to transform the determined URI and hide the determined URI in the audio data.

12. The apparatus of claim 5, wherein the phone URI encoding module is configured to encode the determined URI into one or more modem signals, and the modem signals are part of the audio data.

13. The apparatus of claim 5, wherein the phone URI encoding module is configured to encode the determined URI into an in-band signaling within the audio data.

14. The apparatus of claim 5, wherein the phone URI encoding module is configured to encode the determined URI into a white noise, and the white noise is a part of the audio data.

15. The apparatus of claim 5, wherein the URI is encoded as a part of the communications control signals using the determined encoding method.

16. The apparatus of claim 15 configured to encode the determined URI into an Integrated Services Digital Network (ISDN) signal, and the ISDN signal is sent to the second endpoint over the communications channel.

17. The apparatus of claim 15, wherein the phone URI encoding module is configured to encode the determined URI into a Session Initiation Protocol (SIP) signal, and the SIP signal is sent to the second endpoint over the communications channel.

18. The apparatus of claim 1, further comprising an initialization module configured to validate a sender or a receiver or both a sender and a receiver of a phone URI exchange request against a whitelist or a blacklist.

19. A computer-implemented method comprising:
making a first call between a first endpoint of a first user and a second endpoint of a second user;
in response to making the first call between the first endpoint of the first user and the second endpoint of the second user, automatically retrieving IP information for the first user and the second user;
storing the IP information at an exchange system;
starting a second call between the first endpoint of the first user and the second endpoint of the second user;
determining using the exchange system whether an IP telephony call is possible between the first user and the second user;
placing the second call between the first endpoint of the first user and the second endpoint of the second user over the IP network if the exchange system determined that the IP telephony call was possible; and
placing the second call between the first endpoint of the first user and the second endpoint of the second user over a second network if the exchange system determined that the IP telephony call was not possible.

20. The method of claim 19, wherein the second network is a public switched telephone network (PSTN).

21. The method of claim 19, wherein the second network is a cellular voice network or a cellular data network.

22. The method of claim 19, wherein receiving IP information for the first user and the second user comprises:
receiving a first public IP address for the first user; and
receiving a second public IP address for the second user.

23. The method of claim 22, wherein storing the IP information at the exchange system comprises:
storing an association between the first user and the first public IP address; and
storing an association between the second user and second public IP address.

24. The method of claim 19, wherein the exchange system includes a table and the first public address and the second public address are stored in the table.

25. The method of claim 24, wherein the table stores a first association between the first user and one or more endpoint device addresses and a second association between the second user and one or more endpoint device addresses.

26. The method of claim 24, wherein the table stores an association between the first user and a telephone endpoint device address, a soft phone endpoint device address, and a mobile phone device address.

27. The method of claim 26, wherein the table stores an order in which to connect to the telephone endpoint device, the soft phone endpoint device and the mobile phone device address.

28. The method of claim 19, wherein the exchange system includes a table, and the table stores an association for the first user, the association including a first user identifier, the first public address and at least one endpoint device address.

29. The method of claim 28, wherein the first user identifier is a telephone number or extension of the first user.

30. The method of claim 22, further comprising:
starting a third call between the first endpoint of the first user and the second endpoint of the second user;
determining using the exchange system whether the third call over a mobile network is possible between the first user and the second user;
placing the third call between the first user and the second user over the mobile network if the exchange system determined that the call over the mobile network was possible; and
placing the third call between the first user and the second user over a PSTN if the exchange determined that the call over the mobile network was not possible.

31. A computer computer-implemented method comprising:
receiving a request to establish communication between a first endpoint of a first user and a second endpoint of a second user;
in response to receiving the request to establish communication between the first endpoint of the first user and the second endpoint of the second user, automatically retrieving IP information for the first user;

in response to receiving the request to establish communication between the first endpoint of the first user and the second endpoint of the second user, automatically retrieving IP information for the second user;

storing the IP information for the first user and the IP information for the second user at a URI exchange system;

receiving a request for IP communication;

determining using the URI exchange system whether the IP communication is possible between the first user and the second user; and establishing IP communication between the first user and the second user over the IP network if the URI exchange system determined that the IP communication was possible.

32. The method of claim 31, wherein the IP communication is one from the group of IP telephony, instant messaging, chat, presence, data collaboration, presentation sharing, desktop sharing, application sharing, whiteboard sharing, editable document sharing with audit trails, video, email, voicemail and short message services.

33. The method of claim 31, wherein IP information for the first user is a first public IP address for the first user.

34. The method of claim 31, wherein IP information for the second user is a second public IP address for the first user.

35. The method of claim 31, wherein storing the IP information for the first user and the IP information for the second user at the exchange system comprises:

storing an association between the first user and the first public IP address; and storing an association between the second user and second public IP address.

36. The method of claim 31, wherein the exchange system includes a table and the IP information is stored in the table.

37. The method of claim 36, wherein the table stores a first association between the first user and one or more endpoint device addresses and a second association between the second user and one or more endpoint device addresses.

38. The method of claim 36, wherein the table stores an association between the first user and a telephone endpoint device address, a soft phone endpoint device address, and a mobile phone device address.

39. The method of claim 38, wherein the table stores an order in which to connect to the telephone endpoint device, the soft phone endpoint device and the mobile phone device address.

40. The method of claim 31, wherein the exchange system includes a table, and the table stores an association for the first user, the association including a first user identifier, the first public address and at least one endpoint device address.

41. The method of claim 40, wherein the first user identifier is a telephone number or extension of the first user.

42. The method of claim 31, further comprising:

placing the call between the first endpoint of the first user and the second endpoint of the second user over a public switched telephone network (PSTN) if the URI exchange system determined that the IP communication was not possible.

* * * * *